US012750624B2

(12) United States Patent
Jackson

(10) Patent No.: US 12,750,624 B2
(45) Date of Patent: Sep. 29, 2026

(54) PORTABLE SPEAKER WITH AUDIO MONITOR AND OUTPUT NETWORK LINK

(71) Applicant: Bose Corporation, Framingham, MA (US)

(72) Inventor: Craig R. Jackson, Waltham, MA (US)

(73) Assignee: Bose Corporation, Framingham, MA (US)

( * ) Notice: Subject to any disclaimer, the term of this patent is extended or adjusted under 35 U.S.C. 154(b) by 174 days.

(21) Appl. No.: 18/678,022

(22) Filed: May 30, 2024

(65) Prior Publication Data

US 2024/0406649 A1 Dec. 5, 2024

Related U.S. Application Data

(60) Provisional application No. 63/470,038, filed on May 31, 2023.

(51) Int. Cl.
*H04R 29/00* (2006.01)
*G06F 3/16* (2006.01)

(52) U.S. Cl.
CPC ........... *H04R 29/007* (2013.01); *G06F 3/165* (2013.01); *H04R 2227/003* (2013.01); *H04R 2430/01* (2013.01); *H04R 2430/03* (2013.01)

(58) Field of Classification Search
CPC ......... H04S 1/00; G06F 3/165; H04R 29/007; H04R 2227/003; H04R 2430/01;
(Continued)

(56) References Cited

U.S. PATENT DOCUMENTS 5,970,152 A * 10/1999 Klayman ................ H04S 3/002 381/1
6,983,126 B1 1/2006 Saalman
(Continued)

FOREIGN PATENT DOCUMENTS

CN 103997704 A 8/2014
CN 105828238 A 8/2016
(Continued)

OTHER PUBLICATIONS

Bose Corp., "S1 Pro Multi-position PA System Owners Guide", internet:<https://assets.bose.com/content/dam/Bose_DAM/Web/pro/global/products/portable_PA/S1_Pro/Downloads/807173_og_s1_pro_system_en.pdf>, AM807173 Rev. 02, p. 4, Mar. 2022 (Year: 2022).*

(Continued)

*Primary Examiner* — Vivian C Chin
*Assistant Examiner* — Shin Lee
(74) *Attorney, Agent, or Firm* — Hoffman Warnick LLC

(57) ABSTRACT

Various implementations include portable speakers and methods configured to adjust audio input signals. In one example, a portable speaker includes: at least one electro-acoustic transducer for providing an acoustic output; an audio input for receiving one or more audio input signals; an audio output for providing one or more audio output signals; a communication module for providing a network communication link; and a processor configured to receive the audio input signals and to process the audio input signals to provide the audio output signals, wherein the processor is configured, from a common set of audio input signals, to provide, a first set of audio output signals to the electro-acoustic transducer, such that the first set of audio output signals act as a monitor of the one or more audio input
(Continued)

signals, and a second set of audio output signals via the network communication link.

19 Claims, 19 Drawing Sheets

(58) Field of Classification Search
CPC ...... H04R 2430/03; H04R 27/00; H04R 1/02; H04R 5/04; H04R 2201/025; H04R 2201/028; H04R 2205/024; H04R 2420/07
See application file for complete search history.

(56) References Cited

U.S. PATENT DOCUMENTS

| | | | |
|---|---|---|---|
| 7,571,014 | B1 * | 8/2009 | Lambourne ............. G06F 3/165 700/94 |
| 7,623,502 | B2 | 11/2009 | Waessingbo et al. |
| 7,678,985 | B2 | 3/2010 | Adams et al. |
| 8,340,330 | B2 | 12/2012 | Yoon et al. |
| 10,306,386 | B2 | 5/2019 | Warden et al. |
| 10,524,042 | B2 | 12/2019 | Brousseau et al. |
| 10,555,101 | B2 | 2/2020 | Warden et al. |
| 11,818,524 | B2 | 11/2023 | Puckett et al. |
| 11,902,751 | B2 | 2/2024 | Jackson et al. |
| 2004/0162029 | A1 | 8/2004 | Grady |
| 2006/0083259 | A1 | 4/2006 | Metcalf et al. |
| 2006/0274910 | A1 | 12/2006 | Schul et al. |
| 2007/0061409 | A1 | 3/2007 | Rydenhag |
| 2007/0217633 | A1 | 9/2007 | Copeland et al. |
| 2008/0075295 | A1 | 3/2008 | Mayman et al. |
| 2008/0139081 | A1 | 6/2008 | Lin |
| 2009/0238372 | A1 | 9/2009 | Hsu et al. |
| 2010/0272270 | A1 | 10/2010 | Chaikin et al. |
| 2012/0014534 | A1 | 1/2012 | Bodley et al. |
| 2013/0016138 | A1 | 1/2013 | Sasaki |
| 2013/0156236 | A1 | 6/2013 | Hayashi |
| 2013/0237146 | A1 | 9/2013 | Serota |
| 2013/0244734 | A1 | 9/2013 | Latham et al. |
| 2013/0273966 | A1 | 10/2013 | Griffin |
| 2013/0291708 | A1 | 11/2013 | Orshan |
| 2013/0329905 | A1 | 12/2013 | Awiszus et al. |
| 2014/0064519 | A1 * | 3/2014 | Silfvast .................... G10H 1/18 381/119 |
| 2014/0083278 | A1 | 3/2014 | Dietz |
| 2015/0178038 | A1 | 6/2015 | Yliaho |
| 2016/0112787 | A1 | 4/2016 | Rich et al. |
| 2016/0165345 | A1 | 6/2016 | Vumbaco et al. |
| 2016/0286019 | A1 | 9/2016 | Broadley et al. |
| 2017/0078810 | A1 | 3/2017 | Lee et al. |
| 2017/0325010 | A1 | 11/2017 | Kung |
| 2018/0206026 | A1 | 7/2018 | Notzel |
| 2020/0151646 | A1 | 5/2020 | De La Fuente Sanchez |
| 2020/0351579 | A1 | 11/2020 | Pavelic |
| 2021/0368269 | A1 | 11/2021 | Bounamin Sylla et al. |
| 2023/0007397 | A1 | 1/2023 | Delhoume et al. |
| 2023/0239620 | A1 | 7/2023 | Craig et al. |
| 2024/0056750 | A1 | 2/2024 | Jackson et al. |

FOREIGN PATENT DOCUMENTS

| | | | |
|---|---|---|---|
| CN | 211702287 | U | 10/2020 |
| EP | 3214854 | A1 | 9/2017 |
| EP | 3316594 | A1 | 5/2018 |
| FR | 2917550 | A1 | 12/2008 |

OTHER PUBLICATIONS

PCT International Search Report and Written Opinion for International Application No. PCT/US2024/031540, dated Sep. 30, 2024, 13 pages.
Anonymous: "Guitar Amplifier THR30II Wireless/THR10II Wireless/THR10II Reference Manual," Mar. 1, 2022, pp. 1-20.
Anonymous: "Sonos—Press Release," Nov. 3, 2009, pp. 1-180.
Bose-S1-Pro, Owners Guide, Apr. 2018, 19 pages.
PCT International Search Report and Written Opinion for International Application No. PCT/US2023/011113, dated May 11, 2023, 12 pages.
PCT International Search Report and Written Opinion for International Application No. PCT/US2023/011141, dated Jul. 7, 2023, 21 pages.
PCT International Search Report and Written Opinion for International Application No. PCT/US2023/011134, dated Sep. 1, 2023, 19 pages.

* cited by examiner

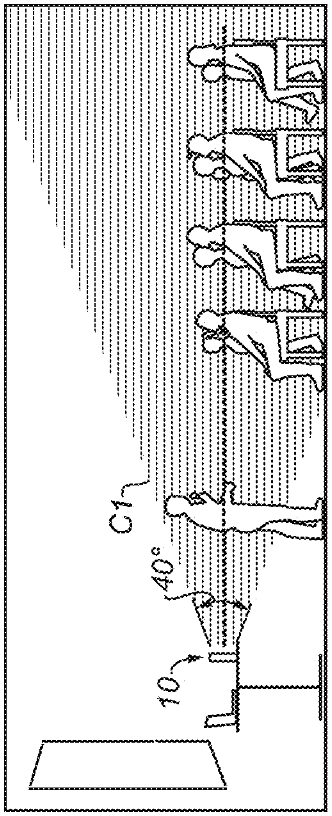
FIG. 2A(1)
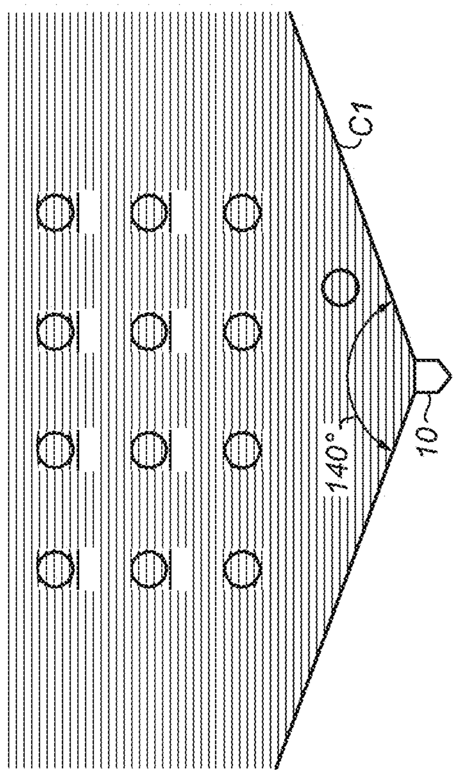
FIG. 2A(2)
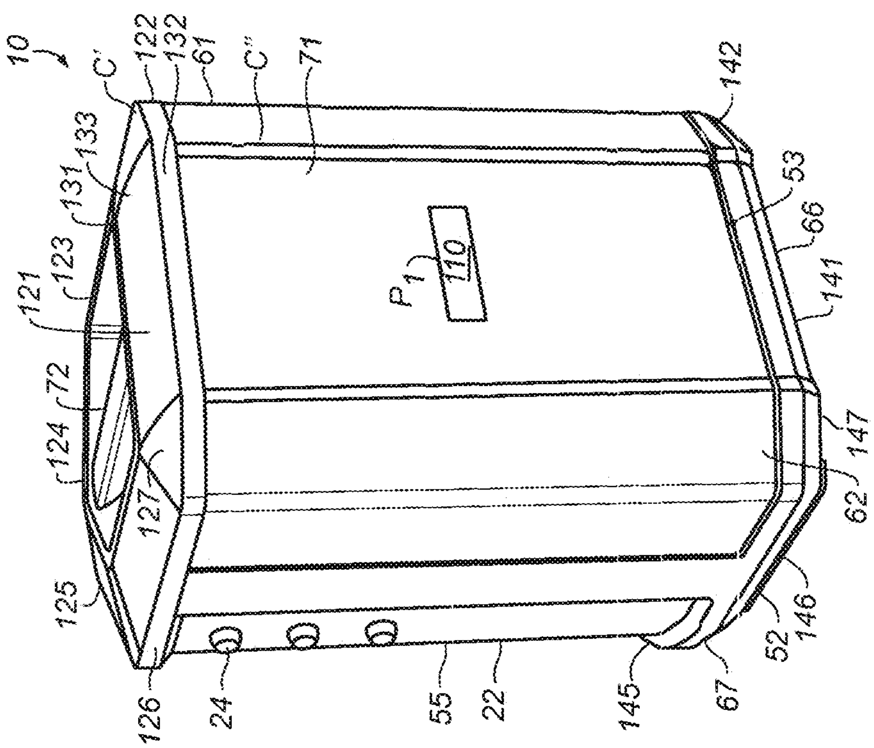
FIG. 1A

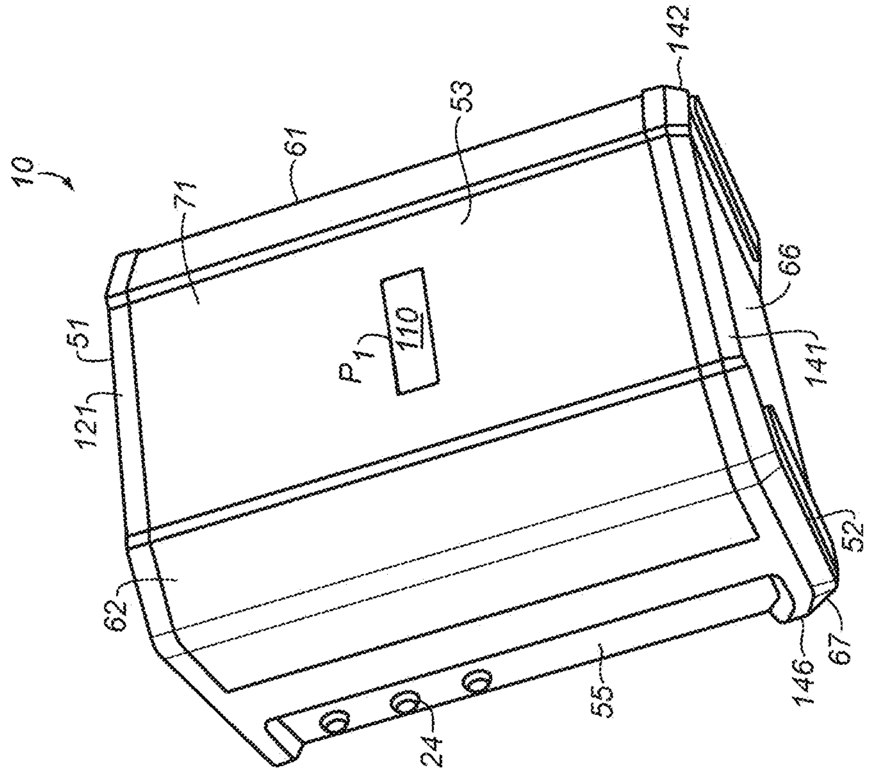
FIG. 1B
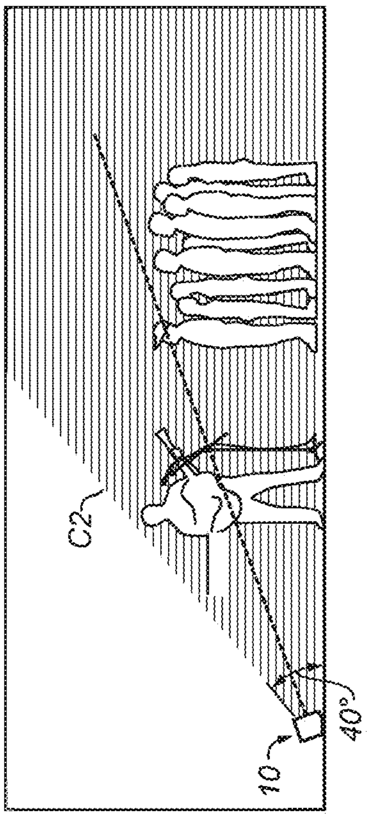
FIG. 2B(1)
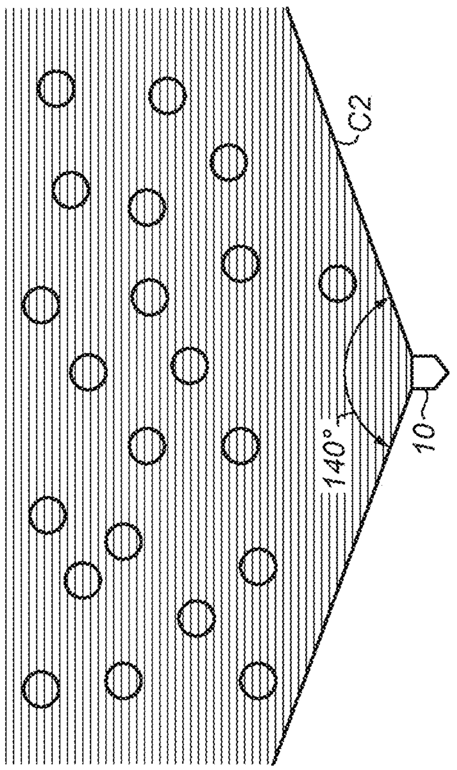
FIG. 2B(2)

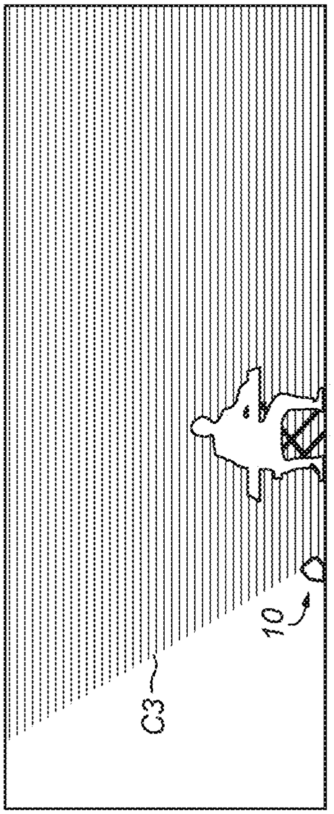
FIG. 2C(1)
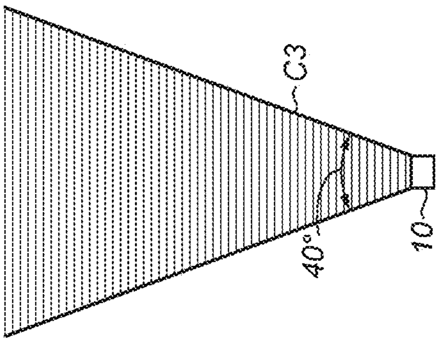
FIG. 2C(2)
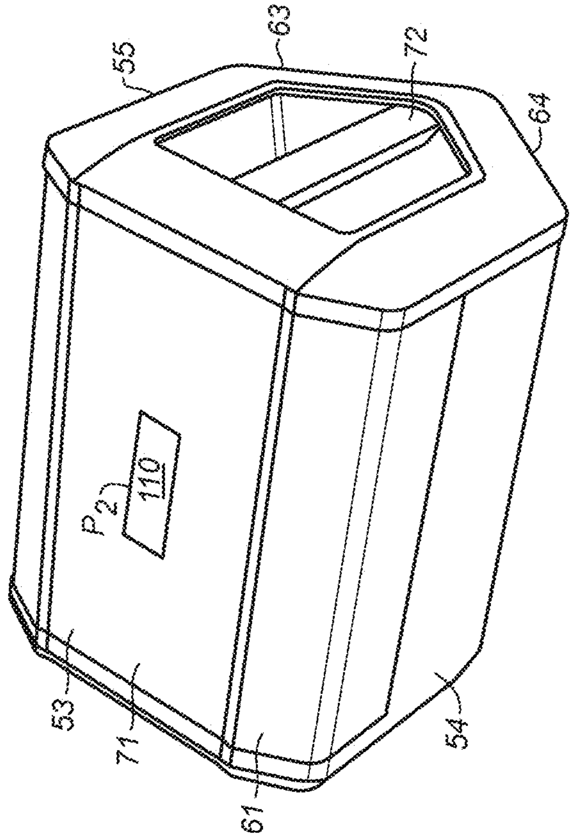
FIG. 1C

PORTABLE SPEAKER WITH AUDIO MONITOR AND OUTPUT NETWORK LINK

PRIORITY CLAIM

This application claims priority to U.S. Provisional Patent Application No. 63/470,038 (Portable Speaker with Audio Monitor), filed May 31, 2023, the entire contents of which are incorporated by reference herein.

TECHNICAL FIELD

This disclosure generally relates to portable speakers. More particularly, the disclosure relates to portable speakers such as portable public address (PA) speakers configured to provide audio monitor and network communication functions.

BACKGROUND

Portable loudspeakers, such as portable PA systems, can provide flexibility for users in various scenarios. However, conventional portable loudspeakers are commonly restricted to a single function at a given time.

SUMMARY

All examples and features mentioned below can be combined in any technically possible way.

Various implementations include portable speakers configured to receive an input audio signal, process the input audio signal to provide an output audio, playback the output audio signal through one or more acoustic transducers, and provide the output signal at an output interface.

Various additional implementations include portable speakers and methods configured to adjust audio input signals. In one example, a portable speaker includes: at least one electro-acoustic transducer for providing an acoustic output; an audio input for receiving one or more audio input signals; an audio output for providing one or more audio output signals; a communication module for providing a network communication link; and a processor configured to receive the audio input signals and to process the audio input signals to provide the audio output signals, wherein the processor is configured, from a common set of audio input signals, to provide, a first set of audio output signals to the electro-acoustic transducer, such that the first set of audio output signals act as a monitor of the one or more audio input signals, and a second set of audio output signals via the network communication link.

Various further aspects include a method of controlling a portable loudspeaker with a network communication link, the method including: receiving one or more audio input signals from an audio input; and processing the audio input signals to provide audio output signals, wherein the processing includes providing: a first set of audio output signals to an electro-acoustic transducer at the portable loudspeaker, such that the first set of audio output signals act as a monitor of the one or more audio input signals, and a second set of audio output signals via the network communication link.

In some cases, the processor includes a digital audio workstation (DAW) for controlling the second set of output signals.

In particular aspects, the second set of audio output signals are sent to at least one of a digital audio workstation, a live stream, or a network-connected recording device via the network communication link.

In some cases, the loudspeaker further includes an amplifier configured to provide an amplified audio signal from at least one of the audio input signals or the audio output signals, wherein the at least one electro-acoustic transducer is configured to provide an acoustic output based on the amplified audio signal.

In certain implementations, the first set of audio output signals and the second set of audio output signals are provided approximately simultaneously.

In particular aspects, the processor enables independent adjustment of the first set of audio output signals and the second set of audio output signals.

In some cases, the processor enables distinct volume control of the first set of audio output signals and the second set of audio output signals. In certain cases, distinct volume control includes applying distinct gains to the input signals.

In particular aspects, the processor enables at least one of distinct equalization settings or distinct mix settings of one or both of the first set of audio output signals and the second set of audio output signals. In certain cases, the distinct mix settings are applied to a mix of at least two inputs.

In some cases, the processor enables operation in at least two modes, including, a first mode where a volume level of the first set of audio output signals and a volume level of the second set of audio output signals are coupled, and a second mode where the volume level of the first set of audio output signals and the volume level of the second set of audio output signals are de-coupled.

In certain aspects, the loudspeaker further includes a user interface enabling switching between the first mode and the second mode, wherein switching between the first mode and the second mode includes a multi-modal adjustment at the interface. In some examples, the multi-modal adjustment includes a press-and-hold command, a press-and-turn command, etc.

In certain cases, the loudspeaker further includes a mixer coupled with the audio input, wherein the audio input includes at least two inputs.

In some aspects, the second set of audio signals includes a dual mono mix of multiple input channels.

In particular implementations, the loudspeaker further includes a set of channel volume controls, wherein after activation of a live stream mode that provides the second set of audio signals, the set of channel volume controls act as faders on a mixer.

In some cases, adjusting a channel volume control adjusts a level of a corresponding channel within the dual mono mix.

In particular aspects, the channel volume controls are located at least one of: a) on a housing of the portable loudspeaker, or b) on a control device (e.g., a smart device) connected with the portable loudspeaker.

In certain aspects, processing the audio input signals includes adjusting at least one of a relative signal level, an equalization, or a reverb of any of one or more of the audio input signals.

In some cases, the processor enables a user to synchronously provide audio output locally with the monitor while streaming or recording the audio output via the network communication link.

In particular implementations, the first set of audio output signals and the second set of audio output signals are provided approximately simultaneously.

In some cases, the method further includes enabling independent adjustment of the first set of audio output signals and the second set of audio output signals.

Further aspects include a portable speaker having: an audio input for receiving one or more audio input signals; an audio output for providing one or more audio output signals to another device; a processor coupled to the audio input and to the audio output configured to receive the audio input signals and to process the audio input signals to provide the audio output signals; an amplifier configured to provide an amplified audio signal from at least one of the audio input signals or the audio output signals; and at least one electro-acoustic transducer for providing an acoustic output based on the amplified audio signal.

Further aspects include processing the audio input signals including adjusting at least one of a relative signal level, an equalization, or a reverb of any of one or more of the audio input signals.

Further aspects include a method of providing acoustic audio, the method comprising: receiving one or more audio input signals; processing the one or more audio input signals to provide one or more audio output signals; providing the audio output signals to another device; amplifying at least one of the audio input signals or the audio output signals to provide an amplified audio signal; and transducing the amplified audio signal into an acoustic output.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIG. 1A is a perspective view of a portable powered public address (PA) loudspeaker system oriented in a first position, in accordance with various implementations.

FIG. 1B is a perspective view of the portable powered PA loudspeaker system of FIG. 1A oriented in a second position.

FIG. 1C is a perspective view of the portable powered PA loudspeaker system of FIGS. 1A and 1B oriented in a third position.

FIGS. 2A(1) and (2) are illustrations of acoustic coverage of the PA loudspeaker system oriented in the first position shown in FIG. 1A.

FIGS. 2B(1) and (2) are illustrations of acoustic coverage of the PA loudspeaker system oriented in the second position shown in FIG. 1B.

FIGS. 2C(1) and (2) are illustrations of acoustic coverage of the PA loudspeaker system oriented in the third position shown in FIG. 1C.

Figure 3:
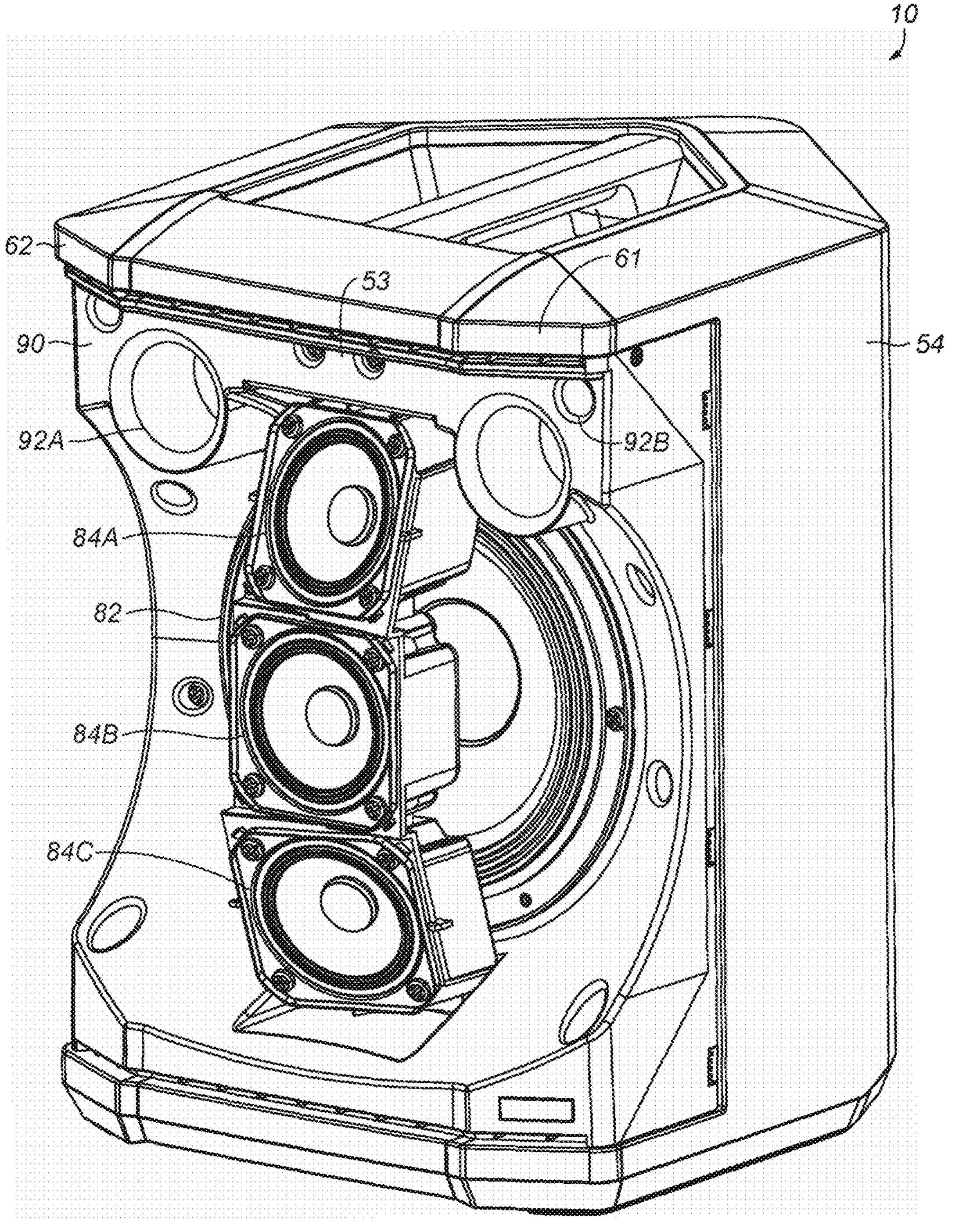
FIG. 3 is a perspective view of an interior of a PA loudspeaker system, in accordance with various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a portable speaker, such as a public address (PA) speaker, can benefit from providing both audio monitor functions and network based output. For example, a portable speaker can be configured to enable output via a network communication link as well as local output as a monitor.

In particular examples, a portable loudspeaker has an electro-acoustic transducer and a processor configured to receive a common set of audio input signals and provide: i) a first set of audio output signals to the transducer such that the first set of audio output signals act as a monitor of the input signals, and ii) a second set of audio output signals via a network communication link. In some cases, the network communication-based output is called a "live stream." In certain cases, the portable loudspeaker enables distinct control of the output signals, for example, maintaining a volume or equalization (EQ) level of the second set of audio output signals while the volume and/or EQ of the first set of audio output signals is adjusted.

In order to achieve the functions of the portable speakers disclosed according to various implementations with conventional audio devices and systems requires at least two distinct audio devices connected to a computing device. For example, achieving the functions of the portable loudspeakers disclosed according to various implementations requires, for example, a speaker for providing audio output as a monitor, and a separate audio input device to the computing device.

In contrast to these conventional devices and systems, the loudspeakers and related approaches disclosed herein enable greater user control and device functionality. Further, in some examples, the disclosed loudspeakers and related approaches allow users to effectively perform for distinct audiences in distinct locations with the ability to control output to those distinct locations.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term “approximately” is used to modify values, and in these cases, can refer to that value+/−a margin of error, such as a measurement error, which may range from up to 1-5 percent.

PA loudspeaker systems in some examples are constructed with specific target customer segments in mind. For example, a primary use of a PA loudspeaker system may be for a solo musician who requires a voice or instrument amplifier, for example, a guitar or drums, to perform street performances, or for a disk jockey who plays songs for a small audience. In another example, a PA loudspeaker system may be a general purpose electro-acoustic driver for amplifying sound, e.g., voice and/or instruments, in a classroom, home Karaoke event, or other event involving small groups of people. In yet other examples, a PA loudspeaker system may be required for a larger audience, such as an auditorium. While particular aspects of loudspeakers such as PA loudspeakers are described herein, additional features of such loudspeakers are also described and illustrated in U.S. Pat. No. 10,555,101 (filed Apr. 2, 2019) and U.S. Pat. No. 10,524,042 (filed Jun. 27, 2017), each of which is incorporated by reference in its entirety.

As shown in FIGS. 1A-1C, a portable powered loudspeaker (e.g., a PA speaker system) 10 may include an enclosure 22 (also referred to as a housing or cabinet) having a top portion 51, a base 52, and plurality of side surfaces extending between the top portion 51 and base 52. For example, as shown in FIGS. 1A-1C, the side surfaces may include a first 53, second 54, third 55, fourth 61, fifth 62, sixth 63, and seventh 64 side surface, each extending along a common direction of extension between a periphery the top portion 51 and base 52 to form an interior of the enclosure 22 where a set of mounted transducers are positioned, for example, shown in FIG. 3. In other examples, the enclosure 22 may have a different number of side surfaces having various widths or other dimensions, for example, fewer than or more than seven side surfaces. The enclosure 22 is constructed to be oriented vertically, horizontally, or angularly, for example, tangential or non-perpendicular to the ground surface on which the loudspeaker 10 is positioned. The top portion 51 may include a plurality of inclined wall portions 121, 122, 123, 124, 125, 126, 127 that each incline, taper, or slope from a bottom region of the top portion 51 abutting the side surfaces to a top region, to provide ruggedness and portability to the loudspeaker 10. Each top wall portion 121-127 has a top horizontal border portion 131, a bottom vertical border portion 132, and a sloped or inclined portion 133 that extends between the top 131 and bottom 132 portions. Thus, the periphery of the bottom region of the top portion 51 formed by the bottom portions 132 of the top wall portions 121-127 may include a lip, and therefore be of a larger parameter than that of the top region formed by the top horizontal border portions 131. The lip formed by the vertical bottom portions 132 of the top wall portions 121-127 of the top portion 51 of the enclosure 22 may also have a width that is greater than a width of a portion of the enclosure 22 formed by the side surfaces 53, 54, 55, 61, 62, 63, and 64.

The top region of the collective wall portions 121-127 may include a horizontal top border that forms a cavity or recess in the top portion 51 in which a handle 72 may be positioned. The handle 72 can allow for easy, single-handed carrying and transport of the portable loudspeaker 10.

The top portion 51 may have a pentagon shape formed of wall portions 121, 123, 124, 125, and 126. However, the top portion 51 may not have a perfect pentagon shape (i.e., all five sides having a same length), since the wall portions may be of different lengths, and since other wall portions may extend between the five pentagonal sides. For example, as shown, the top portion may include wall portion 122 between wall portion 121 and 123 and wall portion 127 between wall portions 121 and 126, which provide a bevel or cutoff at regions that would otherwise be corners between wall portions 121 and 123 and 121 and 126, respectively. In some examples, top wall portions 121-127, and corners formed therebetween, may align along a common direction of extension as side surfaces 53, 54, 55, 61, 62, 63, and 64, and corners therebetween. For example, a corner region C' between wall portions 121 and 122 may extend along a same axis as corner region C" between side surfaces 53 and 61 as shown in FIG. 1A. In some examples, a base side surface, for example, side surface 142, may be a same width as an enclosure side surface, for example, 61. In other examples, the width of a base side surface may be different than that of a corresponding enclosure surface.

The base 52 on the opposite side of the enclosure 22 as the top portion 51 includes wall portions 141-147, or side portions that extend from a flat bottom surface portion 66 and angled bottom surface portion 67 of the base 52, at a predetermined angle, for example 30 degrees. Flat bottom surface portion 66 is coupled to, integral with, or otherwise aligned with side surfaces 52, 53, and 54. Angled bottom surface portion 67 is coupled to, integral with, or otherwise aligned with side surfaces 63 and 64, which each have a tapered surface to permit the taper of the bottom surface portion 67.

The base wall portions 141-147 of the base can include a first portion that inclines, tapers, or slopes from the bottom surface 66, 67, and a second portion that extends vertically, e.g., along a same or parallel plane as a corresponding side wall. The collective first base wall portions form a border having a smaller parameter than that of the second base wall portions. The border formed of second base wall portions, for example, may include a lip that is wider than a peripheral outer surface of the enclosure 22 formed by the side surfaces 53, 54, 55, 61, 62, 63, and 64.

Therefore, each of the top 51 and bottom base 52 may have a width, circumference, periphery, or related dimension that is greater than that of the peripheral sidewall region formed by the side surfaces 53, 54, 55, 61, 62, 63, and 64 so that some or all of the side surfaces are recessed relative to the top portion 51 and base 52, preventing elements from the walls, i.e., control elements 24, handle 72, and so on, from protruding past the outermost surface of the top portion 51 and base 52, therefore, permitting walls of the top portion 51 and base 52 to be positioned on a flat surface without interference of such elements.

In some examples, the enclosure 22 may be formed, molded, of a single material so that the top portion 51 and base 52 are unitary or integral with at least several of the side surfaces, for example, one piece. In some examples, all side surfaces except first side surface 53 are integral with the top portion 51 and base 52, for example, shown in FIG. 3. In some examples, one or more panels may be positioned over the enclosure 22, at least one panel forming or covering one of the side surfaces. For example, a front grille, screen, or panel 71 may form the first side surface 53 or may be positioned over another layer of material forming the first side surface 53, or may simply cover an opening of the enclosure. In some examples, the front grille 71 extends from the first surface 53 to at least a portion of adjacent side surfaces 62, 62, 54, and/or 55. In other examples, instead of a frame, the panels forming the side surfaces are directly coupled to each other to form a periphery about the interior of the enclosure 22.

In some examples, as shown in FIG. 3, electro-acoustic transducers are positioned to provide an audio output. For example, a horn-type woofer 82 and tweeters 84A-84C (generally, 84) may be positioned to output sound waves from the first side surface 53, and through the front grille 71. Also behind the front grille 71 may include two or more acoustic ports 92A, 92B (generally, 92) for permitting an air and/or acoustic flow path through the interior of the enclosure 22, for example, behind the woofer 82. In some examples, as shown in FIG. 3, a sub-enclosure 90 may be coupled to the system frame, for receiving and holding in place the woofer 82, tweeters 84, and acoustic ports 92. Multiple panels and/or sides, for example, side surfaces 53, 61, and 62 may be positioned over the sub-enclosure 90.

Figure 4:
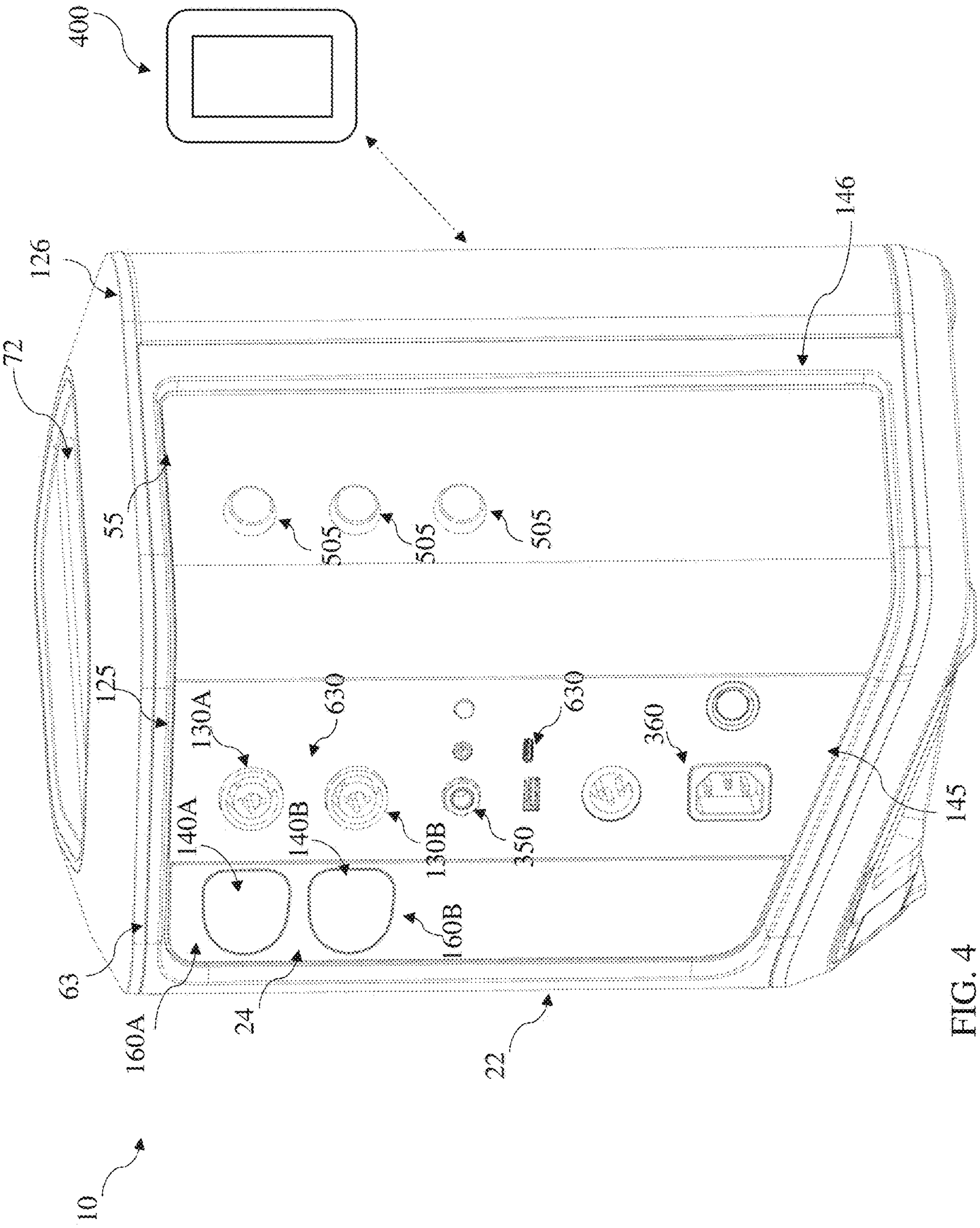
FIG. 4 is another perspective view of the PA loudspeaker system of FIGS. 1A-3 oriented in the first position, including a view of a set of control knobs and switches positioned at one or more sides of the PA loudspeaker system, in accordance with various implementations.

FIG. 4 illustrates one of the side surfaces (e.g., side surface 63) that includes one or more control elements 24, such as interfaces, connectors, knobs, switches, etc. In certain implementations, the control elements 24 can be located on a same side of the loudspeaker 10, e.g., side surface 63. In other implementations, control elements 24 can be distributed across two or more surfaces of the enclosure 22. Various additional aspects of the loudspeaker 10 are described in the following sections, features of which can be implemented separately or in any technically feasible combination.

Detachable Wireless Transmitter(s)

Figure 5:
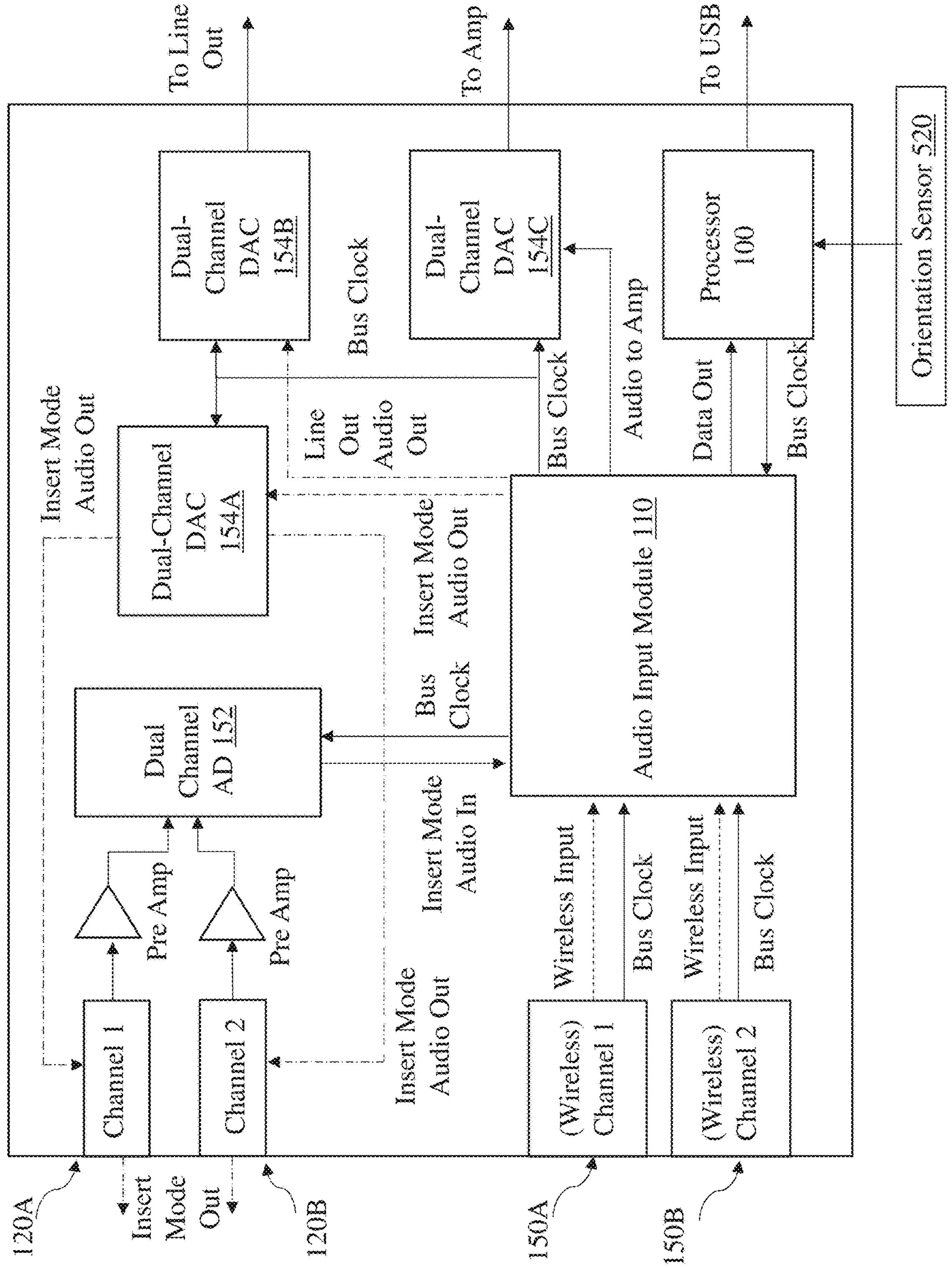
FIG. 5 is signal flow diagram illustrating audio paths and bus paths in a loudspeaker according to various implementations.

FIG. 5 is a system diagram illustrating signal flow paths to and from the loudspeaker 10 according to various implementations. In certain cases, the signal flow paths illustrate audio signal and/or control signal flows to/from the loudspeaker 10 and/or between components contained in the enclosure 22. Certain control components are not illustrated, but can be similarly deployed as described in U.S. Pat. No. 10,555,101. For example, the loudspeaker 10 can include one or more orientation sensor(s) (e.g., an inertial measurement unit, a magnetometer/gyroscope/accelerometer, etc.) for detecting a change in orientation of the loudspeaker 10 and adjusting an equalization setting for the audio output based on that detected orientation change.

In various implementations, the loudspeaker 10 includes a processor 100 (e.g., a system processor that can include one or more microcontrollers)) that is coupled with an audio input module 110 for receiving audio input signals from one or more source devices. In various implementations, the audio input module 110 can include an audio processor module (not shown) for communicating with the system processor 100. In certain implementations, the audio input module 110 can include a wireless communication module, e.g., a Bluetooth or BLE module for communicating with one or more devices over a wireless communication protocol. The processor 100 can be configured to control the amplifier inputs and outputs, including sensor(s) inputs, outputs to fans and other temperature control components, and inputs/outputs to driver (transducer) connectors, such as low-frequency, mid-frequency and high-frequency driver outputs. The processor 100 is also configured to send and receive audio and control signals, e.g., via an amplifier module connector.

In particular cases, the audio input module 110 is configured to receive audio input signals from two or more source devices, which can include distinct types of source device. The loudspeaker 10 is shown including at least one input channel (two shown, as 120A, 120B) for receiving a hard-wired audio input connection at the enclosure 22. The corresponding input connectors 130A, 130B for channels 120A, 120B are illustrated in FIG. 4. Additionally, as shown in FIGS. 4 and 5, the loudspeaker 10 can further include at least one wireless transmitter 140 (example of two transmitters 140A, 140B shown) detachably housed in the enclosure 22 and in communication with a corresponding wireless input channel 150 (example of two input channels 150A, 150B, shown in FIG. 5) for receiving audio input from a source device (e.g., an instrument, a microphone, etc.). In certain implementations, each wireless input channel 150 corresponds to an input channel 120A, 120B for receiving a hard-wired input connection (e.g., at connectors 130A, 130B). That is, the loudspeaker 10 enables a user to connect a source device either wirelessly, or via a hard-wired connection, to the same input channel (e.g., Channel 1, Channel 2, etc.). In the example shown in FIGS. 4 and 5, two wireless transmitters 140A, 140B are shown that correspond with a distinct wireless input channel 150A, 150B and enable distinct wireless connections between a source device and the channels 150A, 150B.

Figure 6:
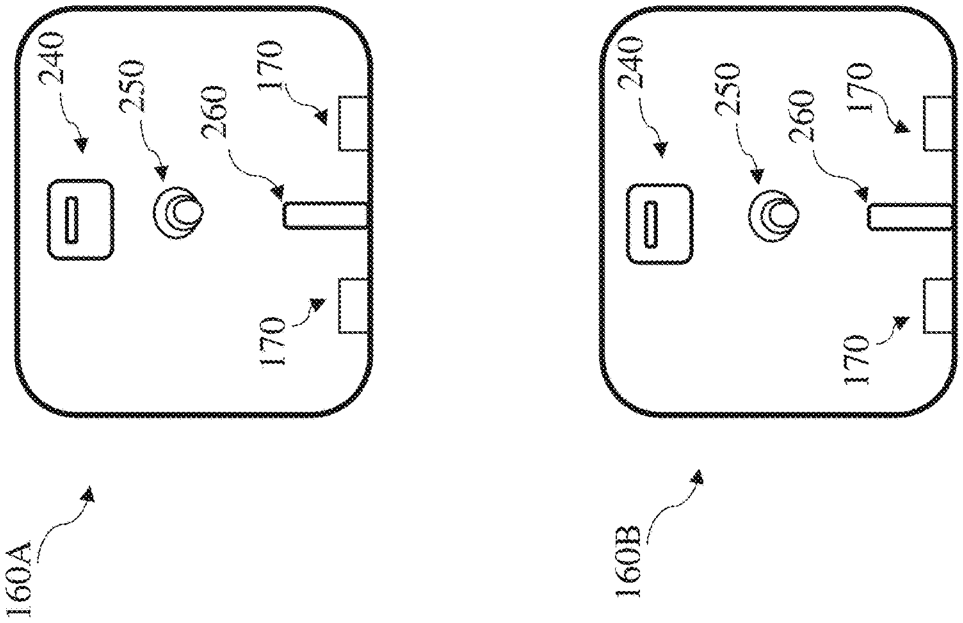
FIG. 6 shows an end view of a set of docks in a loudspeaker according to various implementations.

FIG. 5 illustrates additional components in the loudspeaker circuitry for performing audio and/or control processes, including, e.g., an analog-to-digital converter (ADC) 152 and stereo digital-to-analog converters 154A, 154B, 154C. Certain data flow and signal flow paths are shown for illustrative purposes, and are not intended to limit the various implementations. In certain cases, wireless connection flow paths are contrasted with hard-wired connection flow paths by "Wireless FIG. 6 is a close-up view of dock(s) 160 for housing transmitter(s) 140, with the transmitters 140 removed. In various implementations, transmitter 140 is configured to mechanically engage and disengage from the loudspeaker 10 at the dock 160. According to certain implementations, the dock 160 has a greater depth than a width or height, allowing it to receive the connector for each transmitter 140. In particular cases, the transmitter 140 is detachable from, and attachable to, the loudspeaker 10 at the dock 160 without a tool or other external device. For example, the transmitter 140 can be configured to connect with the dock 160 via interlocking arm(s) or hook(s), spring-loaded mounts, forcefit connectors, etc. In these cases, the user can connect and disconnect the transmitter 140 from the loudspeaker 10 by hand.

Figure 7:
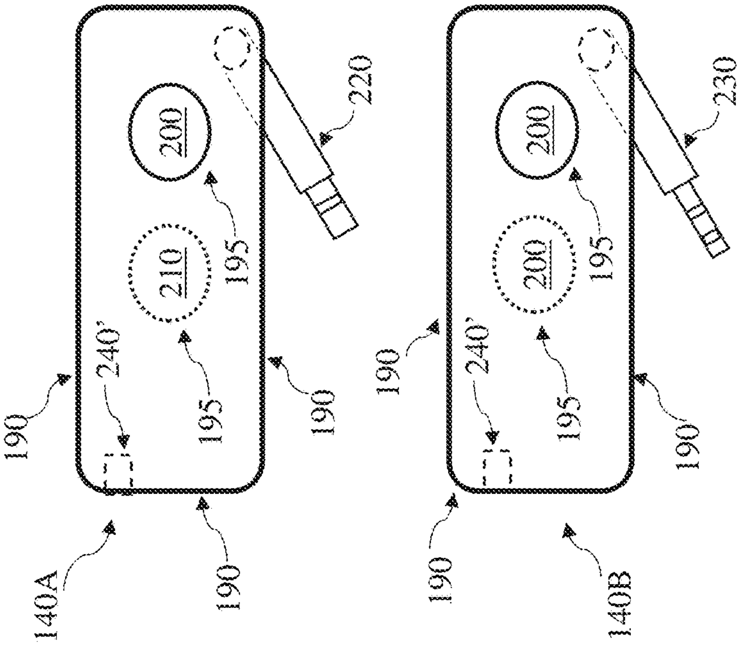
FIG. 7 shows a side view.
Figure 8:
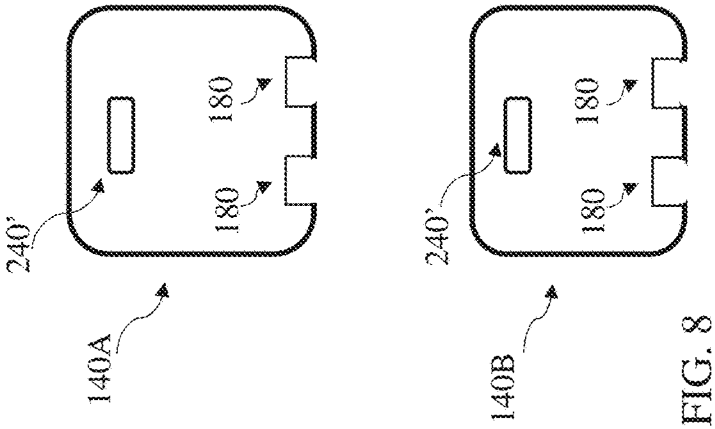
FIG. 8 shows an end view, respectively, of a set of wireless transmitters for a loudspeaker according to various implementations.

FIG. 7 is a side view of a set of transmitters 140 removed from a dock 160. FIG. 8 shows an end view of the transmitters 140 in FIG. 7. With reference to FIGS. 6-8, the transmitter 140 can be configured to slide into and out of the dock 160 on one or more rails 170 or other guide members in the dock 160. In some cases, each dock 160 has a pair of rails 170 for aligning a corresponding transmitter 140 when docked. In certain implementations, as illustrated in FIG. 8, the transmitter 140 can include a recess 180 (two shown in this example) that complements a rail 170. In other cases, a recess can be positioned in the dock 160 and a rail (or similar protrusion) can be positioned on the transmitter 140. That is, any manner of complementary alignment features can be utilized to align the transmitter 140 in the dock 160. In additional implementations, the transmitter 140 includes a compliant material 190 at an interface with the dock 160. This compliant material 190 may differ from a stiffer material located on other portions of the transmitter 140, and may enable a desirable, consistent fit between the body of the transmitter 140 and the dock 160.

In some implementations, each transmitter 140 can include a command button 195 for controlling one or more functions of the transmitter 140. For example, as shown in FIG. 7, the transmitter 140 can include a power button 200 for powering the transmitter 140 on and/or off. In some implementations, as illustrated optionally in phantom, the transmitter 140 can also include a mute button 210 for muting the output from the transmitter 140.

In certain implementations, as shown in FIG. 7, one of the transmitters 140A includes a tip-sleeve (TS) audio connector 220 for coupling with a source device. As depicted, the TS audio connector 220 is configured to nest or otherwise retract into the body of the transmitter 140A, which can protect the connector 220 as well as enable docking and removal from the dock(s) 160. FIG. 7 shows the connector in an intermediate state, with a portion of the TS audio connector 220 outside of the body of the transmitter 140. It is understood that in certain implementations, the TS audio connector 220 can be substituted with a tip-ring-sleeve (TRS) audio connector. The TS audio connector 220 can be configured to couple with a source device such as an electric instrument (e.g., guitar, keyboard, etc.) or any other output device with a corresponding TS mating connection. In additional implementations, one of the transmitters 140B includes an XLR audio connector 230 for coupling with a source device. The XLR audio connector 230 can be configured to couple with a source device such as a microphone or other line level source(s). In various implementations, each dock 160 is configured to receive any of the transmitters 140. That is, a first dock 160A can be configured to receive either transmitter 140A or transmitter 140B, and second dock 160B can be configured to receiver either transmitter 140A or transmitter 140B. Further, it is understood that input connectors 130 can be configured to make physical connections with TS, TRS and/or XLR audio connectors.

As described herein, the dock(s) 160 can provide both a physical and electrical connection with transmitter(s) 140 for storage as well as power/charging and communication. For example, looking at FIGS. 7 and 8, each dock 160 can include an electrical and/or data connector 240 for coupling with a corresponding connector 240' (illustrated as internal to the body) on the transmitter 140. In certain cases, the electrical and/or data connector 240 can include a USB connector. In particular examples, connector 240 (e.g., a USB or variation such as USB-C connector) enables a software update of the transmitter 140, or a debug accessory mode (DAM) operation at the transmitter 140.

Dock 160 can also include a spring-loaded coupling 250 and a magnet 260 (or a plurality of magnets). In certain cases, the spring-loaded coupling 250 allows a user to perform a push-to-engage and/or push-to-release function to couple and decouple, respectively, the transmitter 140 from the dock 160. In certain cases, when docked, the outer face of the transmitter 140 is approximately flush with the outer surface of the enclosure 22. This position can be maintained by the spring-loaded coupling and magnet 260. In certain cases, the spring-loaded coupling 250 enables release of the transmitter 140 such that a user can grab the transmitter 140 to remove from the dock 160. In particular cases, the connector 240 (e.g., USB connector) is maintained in an intermediate position, such that the transmitter 140 remains connected to the magnet 260 and the connector 240 even after release of the spring-loaded coupling 250. In other terms, a force greater than the spring force of the coupling 250 is required to overcome the coupling of the transmitter 140 with the connector 240 and the magnet 260. In this sense, the connector (e.g., USB connector) 240 has a minimal retention force to maintain the data connection with the loudspeaker 10.

In some cases, each wireless transmitter 140 has a battery and is configured to initiate charging of the battery in response to being engaged in one of the docks 160. For example, in response to detecting a connection at connector 240 (e.g., USB connection), the processor at the loudspeaker 10 is configured to initiate charging of the transmitter 140.

In additional implementations, each transmitter 140 is configured to connect a source device (e.g., instrument, microphone, etc.) with a corresponding wireless input channel (e.g., Channel 1, Channel 2, etc.) in response to detecting a connection with the source device. In certain implementations, once the user connects the transmitter 140 with the source device, the transmitter 140 automatically pairs the source device with the input channel (e.g., Channel 1, Channel 2, etc.). In certain implementations, if the transmitter 140 is in a sleep or standby state prior to connection with the source device, the transmitter 140 is configured to wake in response to detecting the connection with the source device. In particular cases, the transmitter 140 in a sleep or standby state first wakes, then connects the source device with the input channel in response to detecting the connection.

Figure 9:
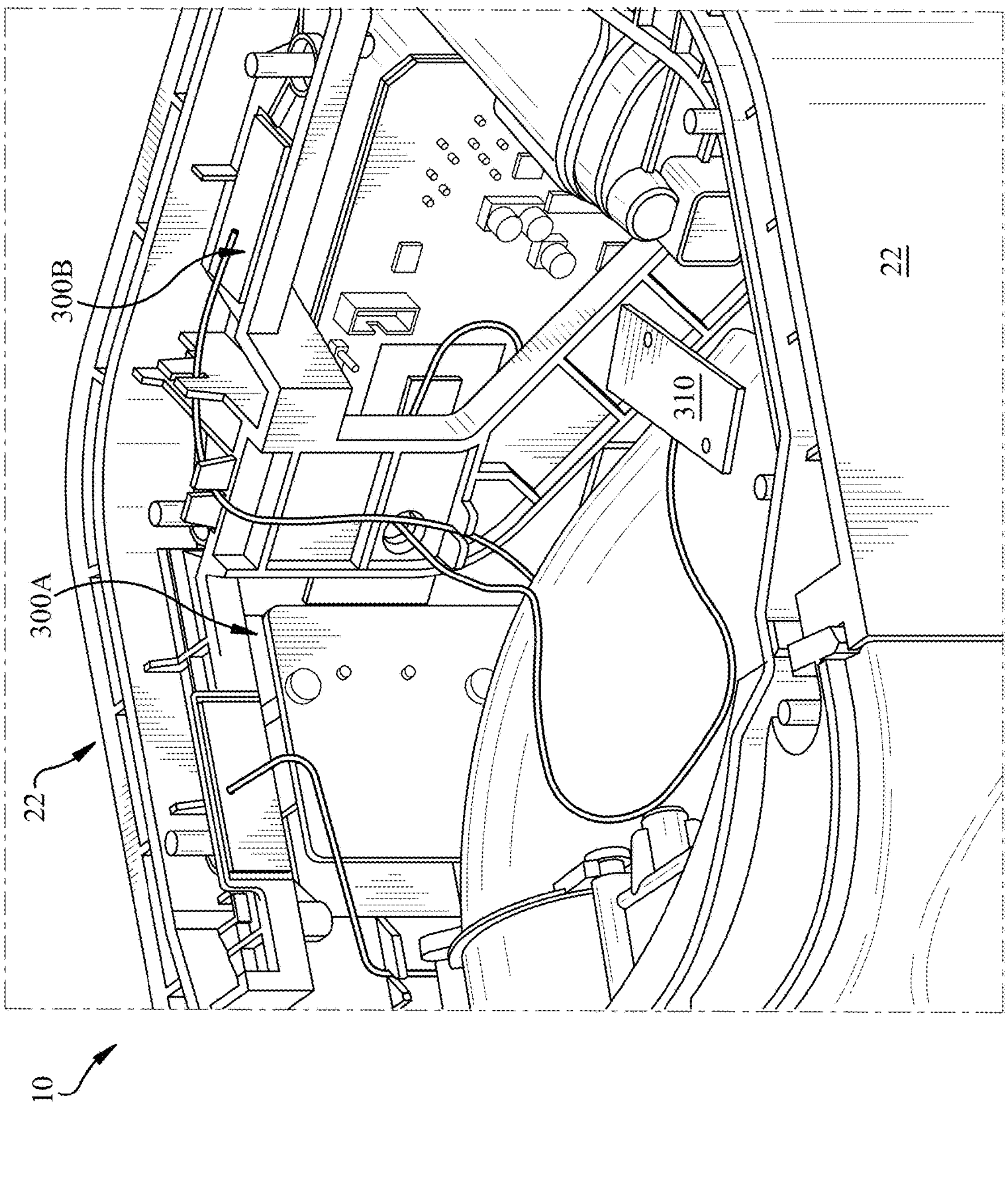
FIG. 9 is a perspective cut-away view of a loudspeaker illustrating antennae locations according to various implementations.

As described herein, in scenarios where the loudspeaker 10 has multiple transmitters 140 for sending signals to multiple input channels (e.g., Channel 1, Channel 2), the processor at the loudspeaker 10 is configured to receive audio input from each of the wireless input channels. In particular cases, each wireless input channel has a separate wireless antenna. In some cases, the separate antenna are dedicated to the corresponding wireless input channel. FIG. 9 illustrates a perspective cut-away view of a portion of the loudspeaker 10, illustrating an example of two separate wireless antenna 300A, 300B (e.g., radio frequency (RF) antenna), along with a Bluetooth (BT) antenna 310. In certain implementations, each antenna 300A, 300B is positioned and directed to provide approximately uniform omnidirectional sensitivity to wireless signals from corresponding wireless transmitters 140 along a plane. That is, along a given plane, such as at a height relative to a ground or floor surface, each of the antennas 300A, 300B is approximately uniformly sensitive to wireless signals from a corresponding transmitter 140 in all directions. This allows a user to connect the wireless transmitter 140 for either channel to a source device (e.g., microphone, instrument, etc.) and move around the loudspeaker 10 within a plane without a noticeable difference in wireless signal quality. In certain cases, as noted herein, the loudspeaker 10 is configured to operate in multiple orientations, and each antenna 300A, 300B maintains the approximately uniform omnidirectional sensitivity to wireless signals from the corresponding transmitter (e.g., transmitter 140A, transmitter 140B) along the plane regardless of the orientation of the loudspeaker 10.

In certain implementations, the audio input to the loudspeaker 10 can be controlled by one or more control elements 24 (FIG. 4), such as via a command interface, GUI, dial, button, etc. In additional implementations, the audio input to the loudspeaker 10 can be controlled by a command from an application run on a connected smart device. That is, a user can control the selection of the audio input (e.g., from Bluetooth device, transmitter 140A, transmitter 140B, etc.) with a command from an application run on a connected smart device such as a smart phone, tablet, or dedicated controller.

In additional implementations, the loudspeaker 10 is configured to wirelessly connect with a first additional portable speaker over one of the wireless input channels. For example, the loudspeaker 10 can connect with an additional, similar loudspeaker via a Bluetooth connection (e.g., via BT antenna 310), or via another wireless communication protocol (e.g., Wi-Fi). In certain of these cases, the loudspeaker 10 can provide audio output to the first additional portable speaker via the wireless connection.

In still further implementations, the loudspeaker 10 is configured to wirelessly connect with a second additional portable speaker (e.g., similar to loudspeaker 10) via the wireless input channels and a line-out connection at the second additional portable speaker. In these cases, the loudspeaker 10 is configured to receive audio input from the second additional portable speaker via one of the wireless transmitters 140 coupled with a line-out connector 350 (FIG. 4), forming a wireless daisy chain between the loudspeakers 10.

As noted herein, loudspeaker 10 is configured for both wired power (hard-wired) usage as well as portable (e.g., battery-powered) usage. That is, as shown in FIG. 4, the enclosure 22 can include a hard-wired power connector 360 for charging an on-board battery (housed in enclosure 22) that can power the transducer(s), processor(s), audio input module(s), etc. The hard-wired power connector 360 can also provide power for charging the wireless transmitters 140, which as described herein, include on-board power storage (e.g., battery/batteries). In various implementations, the battery/batteries in the loudspeaker 10 and/or transmitters 140 are rechargeable and/or replaceable.

Automatic Detecting Input Channel

Figure 10:
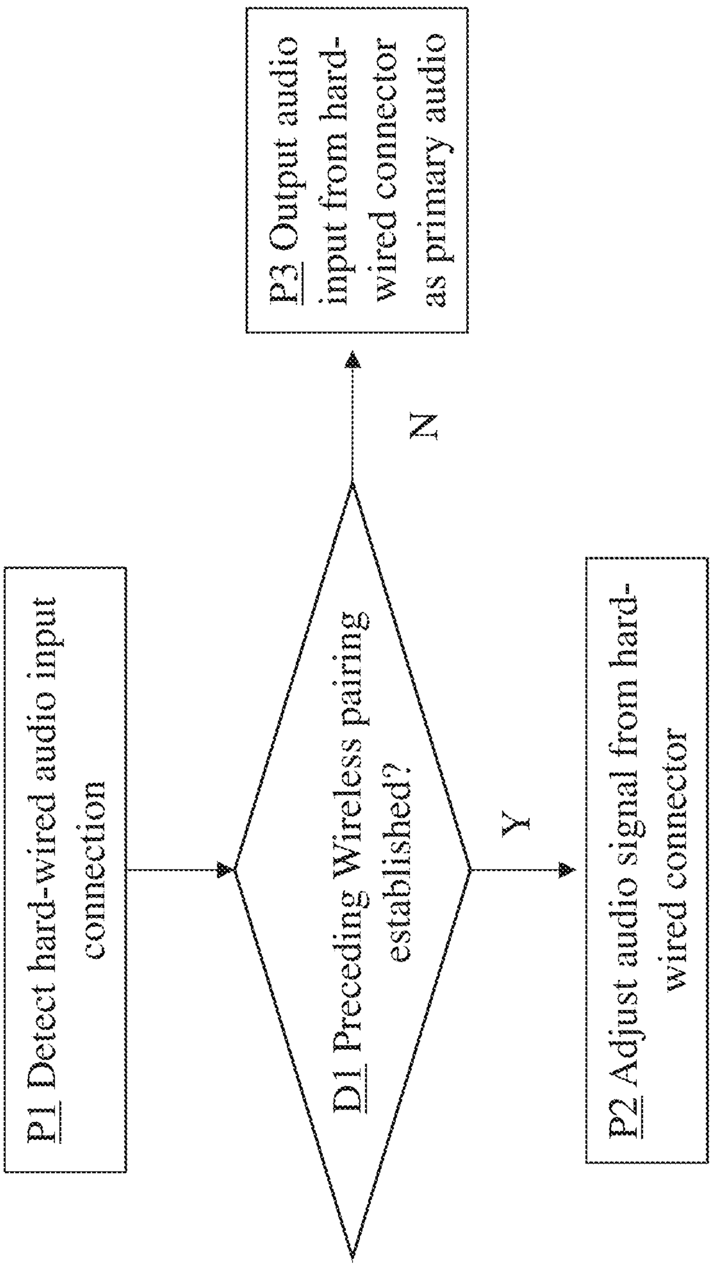
FIG. 10 is a flow diagram illustrating processes in a method according to various implementations.

In particular implementations, the loudspeaker 10 is configured to automatically detect input channels and adjust audio input signals accordingly. In particular cases, the processor 100 is configured to adjust audio signals received from the hard-wired input connection 130 and/or wireless transmitter 140 based on one or more of connection status or connection order. FIG. 10 illustrates a method performed by the processor 100 in managing input connections according to various implementations. For example, in certain cases, the processor 100 is configured to detect a hard-wired audio input connection at connector 130 (process P1), and state of a wireless connection with transmitter 140 (decision D1), and if the wireless connection precedes the hard-wired connection at connector 130 (Yes to D1), the processor 100 adjusts the audio signal from the hard-wired connector 130 (process P2). If a wireless connection does not precede the hard-wired connection (No to D1) the processor 100 outputs the audio input from the hard-wired connector 130 as primary audio (process P3).

In particular implementations, decision D1 (detecting state of wireless connection with transmitter) includes checking whether the wireless transmitter 140 is present in a corresponding dock 160 prior to determining whether an audio input from a source device is detected over the wireless connection 150. In certain of these cases, the processor 100 can determine first whether a wireless transmitter 140 is powered on, and if so, can then determine whether the transmitter 140 is paired with the corresponding channel (e.g., Channel 1 or Channel 2). In further cases, the processor 100 determines whether audio input is being received via the paired wireless transmitter 140. According to some implementations, the loudspeaker 10 only adjusts the audio signal from the hard-wired connector 130 (process P2) if a wireless transmitter 140 is powered on and paired with the corresponding input channel (e.g., Channel 1 or Channel 2). In further implementations, the loudspeaker 10 only adjusts the audio signal from the hard-wired connector 130 (process P2) if a wireless transmitter 140 is paired and an audio input is being received from that transmitter 140. If the processor 100 determines that a transmitter 140 is powered on, but not paired or not providing an audio input, the processor 100 prioritizes the hard-wired connection and outputs the audio input from connector 130 as primary audio (process P3).

In particular examples, adjusting the audio signal in process P2 includes switching the input channel 120 for the hard-wired connector 130 to an effects loop. In certain of these cases, adjusting the audio signal in process P2 includes adjusting a pre-amplification order of the audio signal (from hard-wired connector 130) prior to providing the audio output, for example, by prioritizing amplification of the wireless signal from transmitter 140 over the signal from the hard-wired connector 130. In various implementations, the audio input from the source device (e.g., microphone, instrument, additional connected speaker or audio gateway) received via the hard-wired connector 130 is received as a digital audio input and converted to an analog audio signal. In particular cases, the transmitter 140 transmits at a frequency of approximately 2.4 giga-Hertz (GHz).

Returning to FIG. 4, in particular implementations, the processor 100 is configured to select the audio input (e.g., between transmitters 140A, 140B, connector 130) based on a command from an application run on a connected smart device 400 (e.g., smart phone, smart watch, tablet, controller, etc.). In particular cases, the smart device 400 runs or otherwise accesses a program (e.g., application) configured to control functions of the loudspeaker 10, e.g., selecting inputs, adjusting volume and/or equalization settings, controlling power settings (e.g., on/off/standby), etc. In certain cases, functions of the application can be executed on a dedicated controller in addition to, or alternatively to, the smart device 400.

As is further illustrated in FIG. 4, the loudspeaker 10 can include hard-wired power connector 360 (e.g., to connect with an external power source) for charging the onboard battery and powering the loudspeaker 10.

Dynamic Display Characteristics

Figure 11:
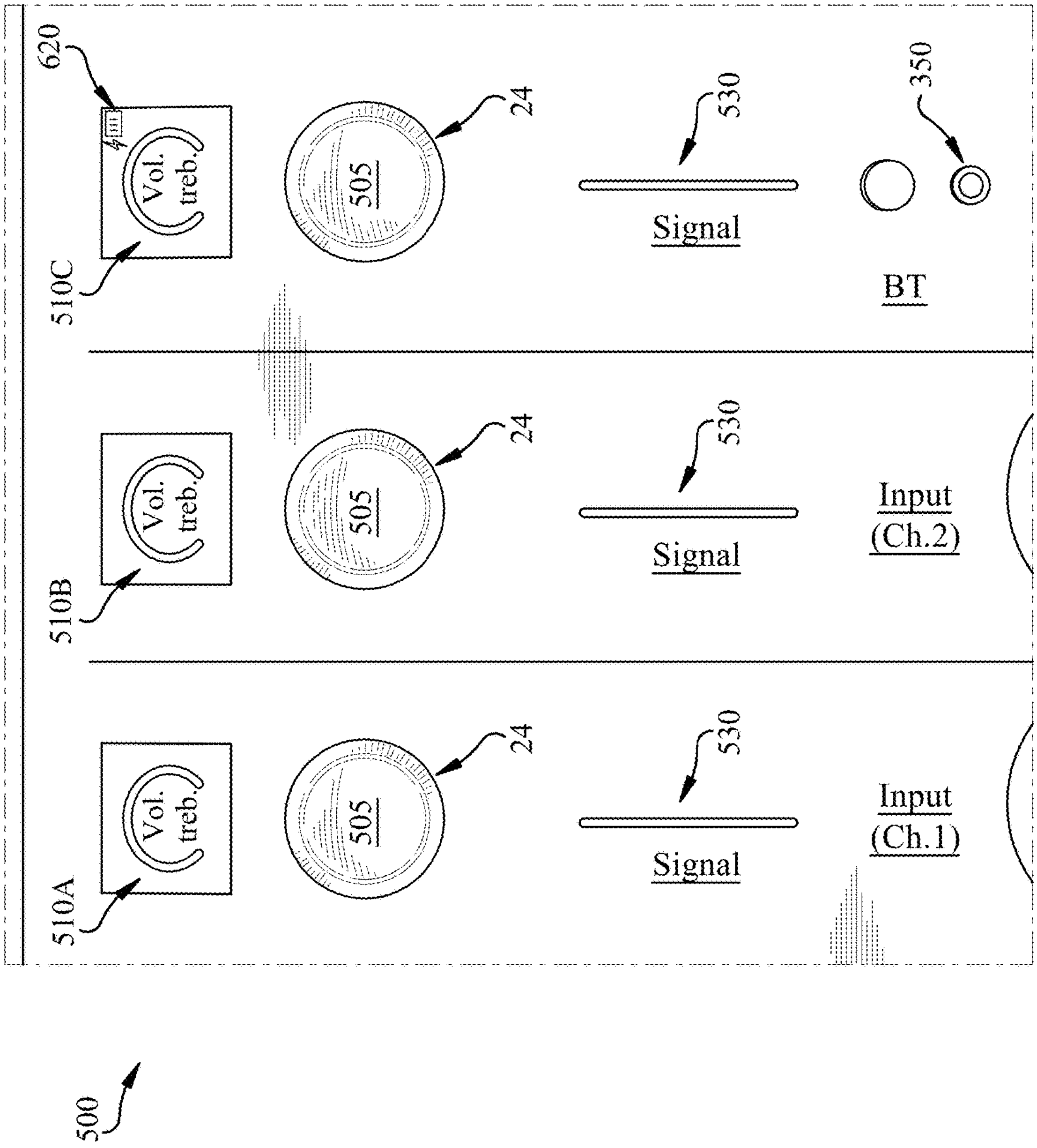
FIG. 11 is close-up depiction of a display in a first orientation, according to various implementations.

FIG. 11 shows a close-up view of a display 500, which can include one or more control elements 24 illustrated in FIG. 4. The display 500 can be located on any of the surfaces of the loudspeaker 10, and in particular cases, is located adjacent to the control elements 24. Examples of control elements 24 shown in FIG. 11 include volume adjustment controls (e.g., knobs) 505 for each of a plurality of inputs (e.g., Channel 1, Channel 2, and BT input). In certain implementations, the display 500 includes a plurality of sub-displays 510A, 510B, 510C. One or more aspects of the display 500 can include digital display elements such as a digital screen or window, e.g., as illustrated in sub-displays 510A, 510B, 510C. In some cases, the sub-displays include organic light emitting diodes (oLEDs).

Figure 12:
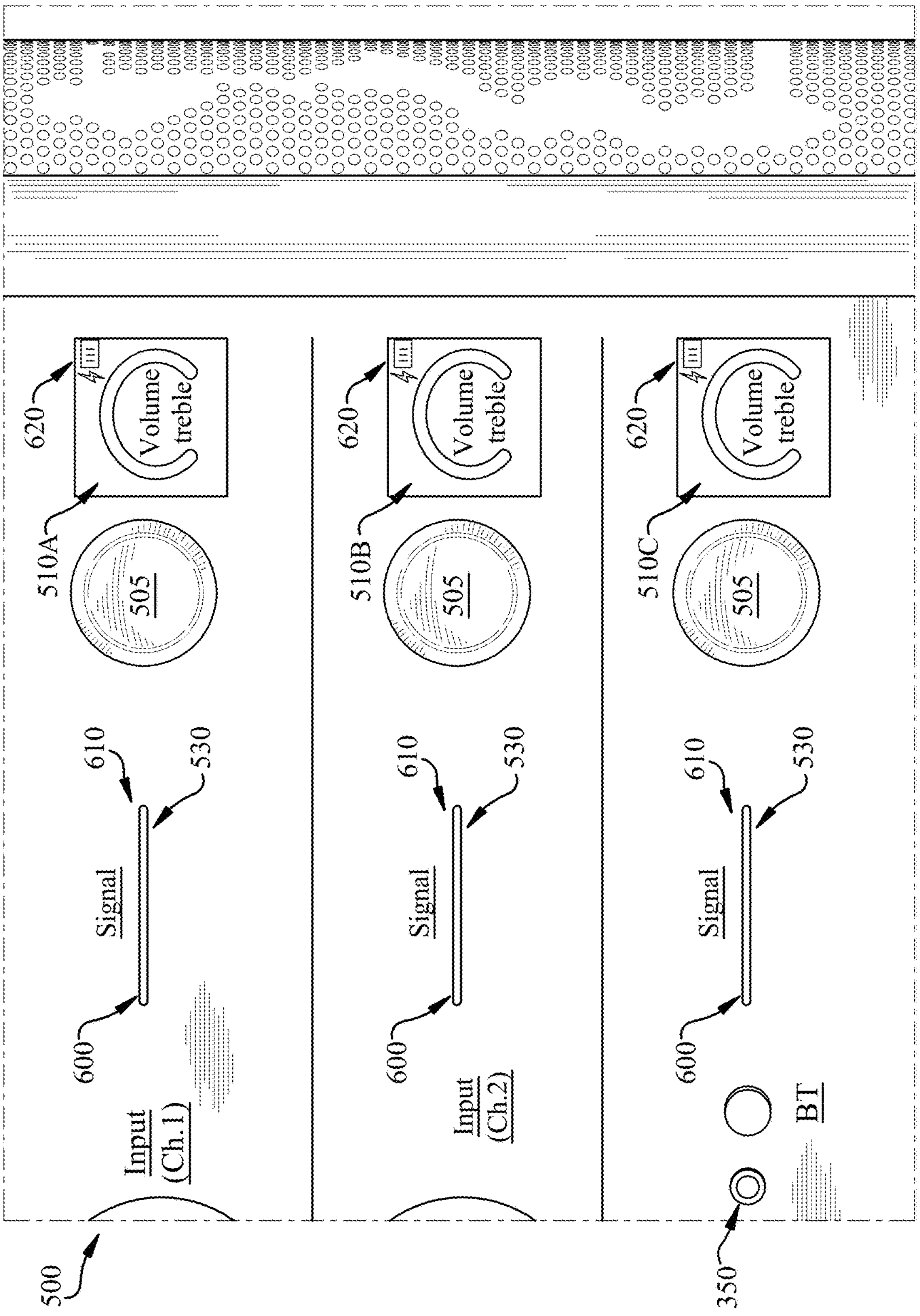
FIG. 12 is a close-up depiction of the display in a second orientation, according to various implementations.

In various implementations, as illustrated in FIGS. 11 and 12, the orientation of the display 500 is configured to adjust between a first orientation (FIG. 11) and a second orientation (FIG. 12) in response to detecting a change in orientation of the loudspeaker 10. That is, when the loudspeaker orientation is adjusted between two or more orientations, the display 500 (e.g., including one or more sub-displays 510A, 510B, 510C) is adjusted between at least two orientations. FIG. 11 shows a first orientation of the display 500 relative to the loudspeaker 10 and FIG. 12 shows a second orientation of the display 500 relative to the loudspeaker 10. In certain implementations, the orientation of the display 500 is intended to be easily discernable to a user in a given loudspeaker orientation, e.g., readable from left-to-right and vertically oriented. As described herein, the loudspeaker 10 can be configured to operate in at least three distinct predetermined playback orientations (e.g., as shown in FIG. 1A, FIG. 1B and FIG. 1C). In certain examples, the first orientation of the display 500 corresponds with two or more of the playback orientations (e.g., as shown in FIG. 1A and FIG. 1B), while the second orientation of the display 500 corresponds with a distinct playback orientation (e.g., in FIG. 1C).

Figure 13:
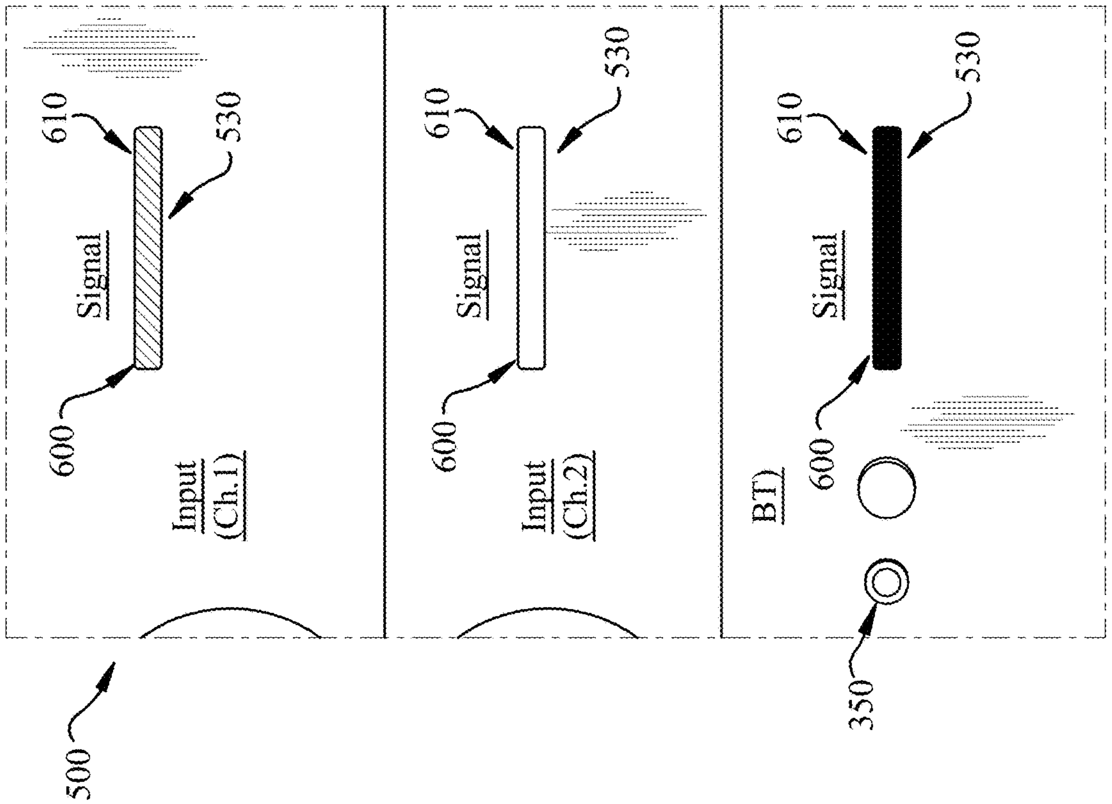
FIG. 13 is a close-up depiction of a portion of a display according to various implementations.

As noted herein, the processor 100 is coupled with an orientation sensor 520 (FIG. 5) for indicating an orientation of the loudspeaker 10. The orientation sensor 520 can include a gyroscope, a magnetometer, an accelerometer and/or an inertial measurement unit (IMU), and can be configured to provide data to the processor 100 regarding changes in orientation in response to detecting such changes, e.g., as modified by a threshold and/or hysteresis factor. In a particular example as shown in FIGS. 11 and 12, the display 500 includes a set of visual signal indicators 530 corresponding with the input channels (e.g., hard-wired channel connections 130A, 130B and/or wireless connections 150A, 150B). As illustrated in FIGS. 11 and 12, the visual signal indicators 530 can provide visual feedback about the signals received at each of the input channels (e.g., via hard-wired connection(s) 130A, 130B and/or wireless connection(s) 150A, 150B). In one example, as shown in a close-up view of the visual signal indicators 530 in FIG. 13, the set of visual signal indicators 530 each have a lower signal end 600 and a higher signal end 610 spanning between: the input channel (connector) 130A, 130B or the dock 160A, 160B, and a corresponding display screen 510A, 510B associated with a given one of the channels. According to some implementations, each visual signal indicator 530 is configured to indicate one or more of: i) no signal (e.g., lack of fill, as shown in Ch. 2), ii) sufficient signal (e.g., green as shown in Ch. 1), or iii) clipping (e.g., an inconsistent signal, or high signal level, as sampled at ~50 ms intervals and illustrated, e.g., red as in BT channel). In certain cases, e.g., where the loudspeaker 10 is in an upright orientation (FIGS. 12, 13), the visual signal indicator 530 spans from the lower signal end 600 at a left-side portion of the display 500 to the higher signal end 610 at a right-side portion of the display 500.

In additional implementations, the display 500 further includes a set of visual battery level indicators 620 (FIG. 11, FIG. 12) corresponding with each of the detachably housed wireless transmitters 140 associated with each wireless input channel 150. In particular cases, battery level indicators 620 can indicate a remaining battery amount (e.g., in percentage terms, level, and/or time) for transmitters 140 that are absent from a corresponding dock 160. Additionally, battery level indicators 620 can display an indicator that a battery is in the process of charging, and/or is fully charged (when applicable), when the transmitter 140 is in a given dock 160. Battery level indicators 620 can also indicate a battery level in a connected Bluetooth device, e.g., connected via BT channel shown in FIGS. 11-13.

In particular implementations, the processor 100 is further configured to communicate with the application run on smart device 400 (FIG. 4) to provide an additional visual signal indicator or an audible signal indicator. For example, a visual signal indicator at the smart device 400 can be displayed through the application interface, e.g., in a progressive manner, to provide information to the user about the signal received via the input channels. The visual signal level indicators at the smart device 400 can be similar in format and/or style to the visual signal indicators 530 on the display of the loudspeaker 10, or can take a different format and/or style. In various implementations, the visual signal level indicators at the smart device 400 are part of a digital display. Additionally, the application can initiate an audible signal indicator via the smart device 400 speakers, such as an audible beep, chime or tone, clipping sound, etc., to indicate a characteristic of the signal received at the channel (s). Even further, the visual and/or audible signal indicators can include information about suggested adjustment(s) to improve the signal received at the speaker 10. For example, the suggested adjustment can include a message (e.g., visual and/or audible) that suggest the user adjust the physical connection (e.g., at hard-wired connector 130), or that the user move the transmitter 140 closer to the speaker 10 (e.g., for wireless transmitter 140).

In additional implementations, the processor 100 is configured to provide an error indicator at the display 500 in response to detecting that the speaker 10 is mis-oriented relative to the predetermined playback orientations. For example, the processor 100 can provide an error indicator (e.g., visual indicator at display 500, and/or audible indicator via the transducer(s) 82, 84 that the speaker 10 is tipped or upside down. In certain implementations, a tipped position is indicated by the speaker 10 being between predetermined playback orientations, or otherwise in an unstable position. In additional implementations, a tipped position is defined by the speaker 10 being in an orientation other than the three predefined orientations in FIGS. 1A, 1B, and IC. An upside down orientation can be defined as any position where the upper surface (e.g., at top portion 51) of the speaker 10 is below the lower surface (e.g., at bottom portion 52).

Returning to FIGS. 11 and 12, in some examples, the display 500 can include three distinct sub-displays 510A, 510B, 510C that are each associated with an actuatable button, knob, switch, etc. In some cases, the actuatable button includes control 505. While the button(s) 505 are illustrated as separate from the associated sub-display(s) 510, in certain implementations, the sub-displays 510 are capable of receiving a push-button command in addition to, or in place of the button 505. That is, the display(s) 510 can include touch interfaces (e.g., capacitive touch interfaces) for receiving touch commands from a user. In any case, the button 505 (and/or display 510) can be configured to receive one or more commands, and in particular cases, a press-and-hold command at a given button 505 presents a configuration menu on the associated display 510. A configuration menu can include a configuration selection and/or adjustment option for a plurality of loudspeaker configurations, for example: battery mode (e.g., low power mode), settings (e.g., audio settings such as equalization, or sleep timer settings), and/or a shutdown menu enabling shutdown of the loudspeaker 10. In certain implementations, as illustrated in FIG. 4, the display 500 further includes a tone match preset switch 630 for enabling tone matching for each of the input channels, including wireless channel inputs from transmitters 140.

Audio Monitor and Network Communication Link

In particular implementations, as noted herein, the loudspeaker 10 is configured to enable audio monitor and/or network communication functions. For example, returning to FIG. 5, in certain cases the processor 100 (in connection with audio input module 110) is configured to receive audio input signals, e.g., from one or more of the input channels, process the input signals, and provide audio output signals to the transducers 82, 84, e.g., via amplifier (To Amp), and to a network communication link (e.g., To USB, such as a USB-C type connector/port). In particular implementations, the USB link (e.g., To USB) includes a USB audio link. Because in various implementations the network communication is facilitated by the To USB connection, the network communication link can also be referred to as a USB audio link. In certain cases, the input signals are provided by one of the insert mode channels 120 one of the wireless channels 150, or a Bluetooth (BT) channel connection (FIG. 12), as described according to various implementations herein. In certain cases, the processor 100 is configured to provide a first set of audio output signals to the transducers 82, 84 and a second set of audio output signals to the USB audio link (or, network communication link; To USB). As described herein, processing the audio input signals can include adjusting at least one of a relative signal level, an equalization, or a reverb of any of one or more of the audio input signals.

In a particular implementation, the first set of audio output signals act as a monitor of the audio input signals, for example, being output locally at the transducers 82, 84 at the loudspeaker 10. In these cases, the second set of audio output signals are provided to a network communication link, e.g., a USB audio link connection to another device that has network connection capabilities. In some cases, the processor 100 enables a user to synchronously provide audio output locally with the monitor while streaming or recording the audio output via the network communication link (USB audio link).

Figure 14:
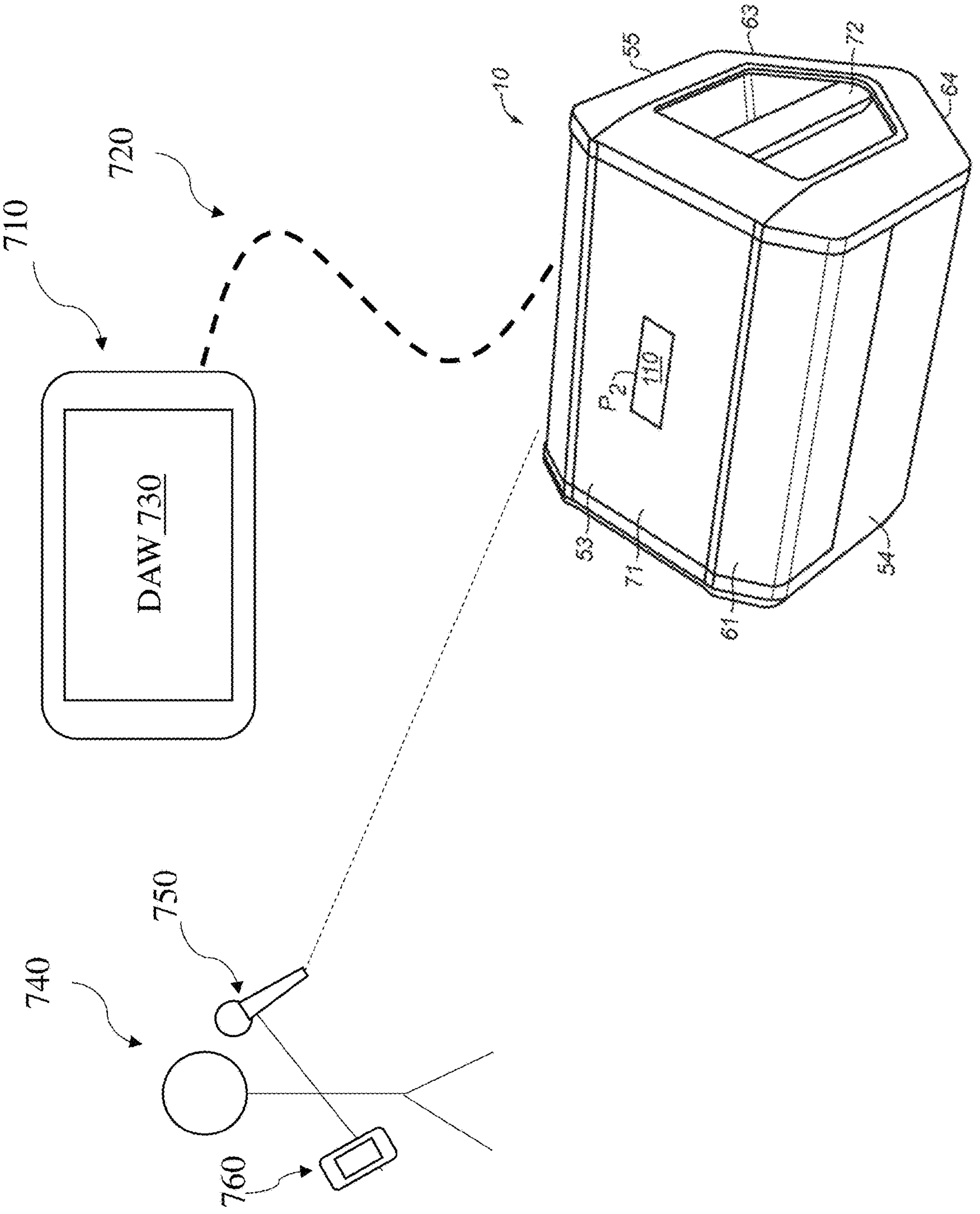
FIG. 14 is schematic depiction of a system including a loudspeaker and a computing device according to various implementations.

In particular examples, as illustrated in the system 700 in FIG. 14, the loudspeaker 10 is coupled with a network interface device 710, e.g., via a network communication link 720 (e.g., USB audio link connector). In some cases, the network interface device 710 includes a computing device such as a personal computer, a tablet, or a smart phone. In particular cases, the network interface device 710 is coupled with a network such as a Wi-Fi network, cellular network or other communication network, including for example, an internet connection. In particular examples, the network interface device 710 includes a computing device having a processor and memory, and can be coupled with the loudspeaker via a hard-wired or wireless connection (or link) 720 (illustrated in phantom). In certain cases, the computing (network interface) device 710 includes a digital audio workstation (DAW) 730, which can include an electronic device or application software used for recording, editing and producing audio files. In certain implementations, the DAW 730 includes an interface (e.g., display and/or controls) for enabling a user 740 to control the second set of output signals. In certain cases, functions of the DAW 730 can be integrated in the processor 100 in loudspeaker 10, e.g., as a software stack.

In the example depiction in FIG. 14, a user 740 is shown with an audio input device 750, e.g., a microphone, which can include a wired or wireless connection with the loudspeaker 10. In particular cases, the audio input device 750 provides audio input signals to the loudspeaker 10, e.g., via channel(s) 120, 150 (FIG. 5). It is understood that multiple audio devices can provide inputs to the loudspeaker 10, e.g., two or more instruments, mixing devices, digital audio output devices, BT connected devices, etc. As described according to various implementations herein, wireless and/or hard-wired inputs can be provided to the loudspeaker 10 and mixed and/or prioritized according to one or more rules.

Returning to the example in FIG. 14, the loudspeaker 10 (e.g., processor 100, FIG. 5) is configured to receive the audio input signals from audio input device 750 and/or a user's smart device 760, and process those input signals to provide audio output signals. In certain cases, the loudspeaker 10 includes an amplifier configured to provide an amplified audio signal from the audio input signals and/or audio output signals, e.g., to the transducer(s) 82, 84. In particular cases, the first set of audio output signals are output by the transducer(s) 82, 84 at the loudspeaker. In this case, the first set of audio output signals act as a monitor of the input signals (e.g., from audio input device 750). Further, the processor 100 is configured to provide a second set of audio output signals via link 720, for example, to the computing device 710. In particular cases, the second set of audio output signals are sent to at least one of a DAW 730, a live stream, or a network-connected recording device via the network communication link 720. According to various implementations, the first set of audio output signals and the second set of audio output signals are provided (e.g., as output at transducer(s) 82, 84 and output to the computing device 710 approximately simultaneously.

In certain examples, the first and second set of audio output signals enable the user 740 to provide outputs to two devices (loudspeaker 10 and computing device 710) from common audio input(s) at approximately the same time. For example, the user 740 can approximately simultaneously use the loudspeaker 10 as an audio monitor (or, local output device) and a network link to provide a "live stream" of audio input (e.g., a performance).

Figure 15:
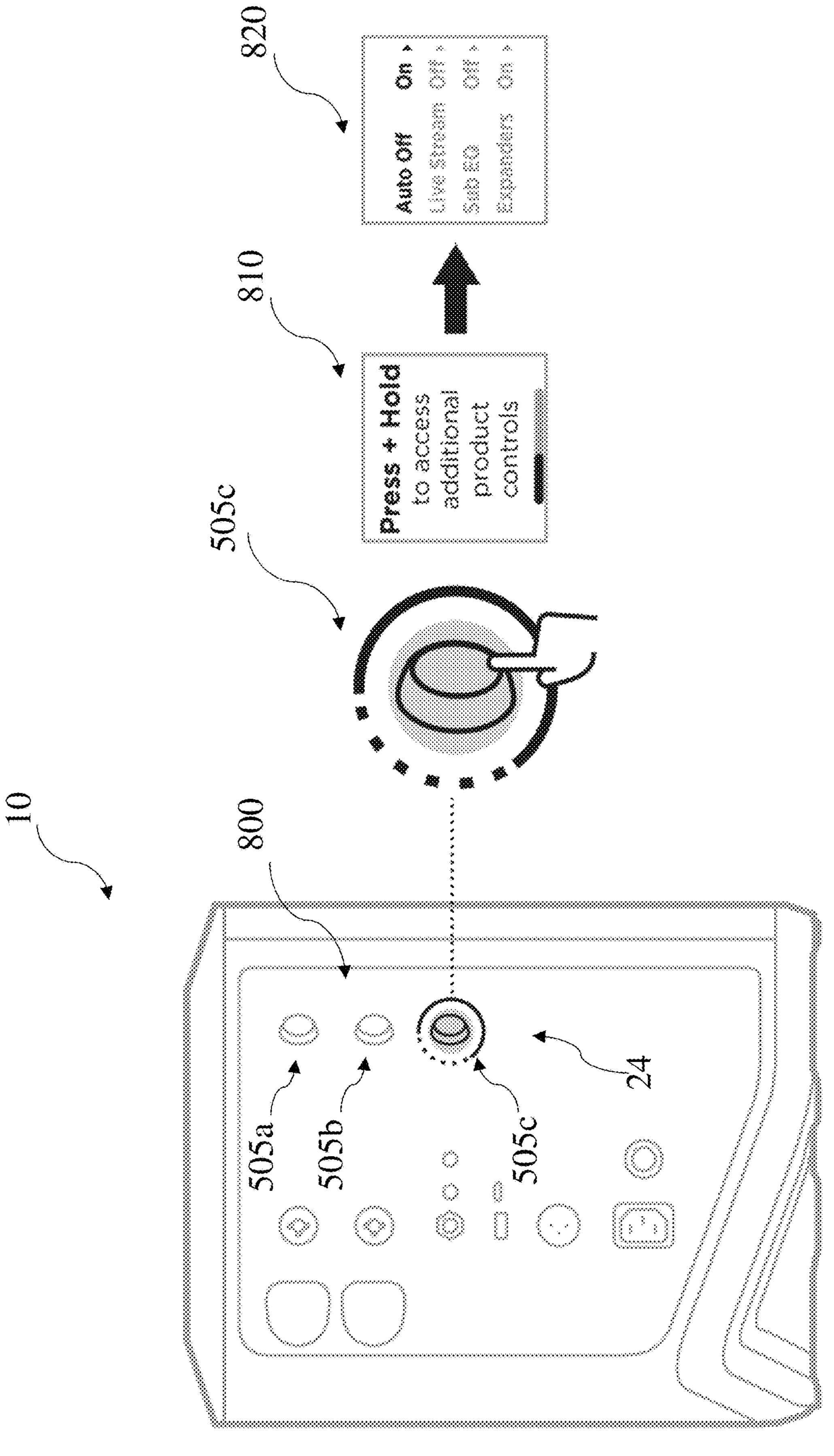
FIG. 15 is a schematic illustration of control functions on a loudspeaker according to various implementations.

FIG. 15 shows an example of a simplified view of the control elements 24 in FIG. 4, including interfaces, connectors, knobs, switches, etc. FIG. 15 also shows a set of adjustment controls (e.g., knobs) 505*a*, 505*b*, 505*c* on a user interface 800. Adjustment controls 505*a*, 505*b*, and 505*c* can correspond to the three distinct input channels (Channel 1, Channel 2, Channel 3 (BT)) available for the loudspeaker 10. It is understood that in some implementations, a similar user interface 800 including one or more of the control elements 24 can be replicated (or, mirrored) on a digital display such as on a computing device 710 or smart device 760. In the example depiction in FIG. 15, a plurality of adjustment controls 505 are configured to enable adjustment of channel audio (e.g., Channel 1, Channel 2, Channel 3 (BT)) and/or accessing additional functions of the loudspeaker 10. In certain examples, the adjustment controls 505 enable adjustment of an output volume for one or more channels (e.g., Channel 1, Channel 2, Channel 3 (BT)). In a particular implementation, adjustment controls 505*a*, 505*b*, 505*c*, enable adjustment of an output volume for a Channel 1, Channel 2, and Channel 3, respectively. In one example, adjustment control 505*c* enables selection of one or more operating modes, including a "live stream" mode whereby the second set of audio output signals are enabled and provided to another device (e.g., via To USB, computing device 710). According to certain implementations, actuating adjustment control 505*c* triggers one or more additional interface displays 810, 820, which can be provided at interface 800 and/or on a connected device such as computing device 710 or another smart device running a control application for the loudspeaker 10. In some cases, the additional interface displays 810, 820 provide instructions and/or mode selection for the multi-mode operations of the loudspeaker 10.

Figure 16:
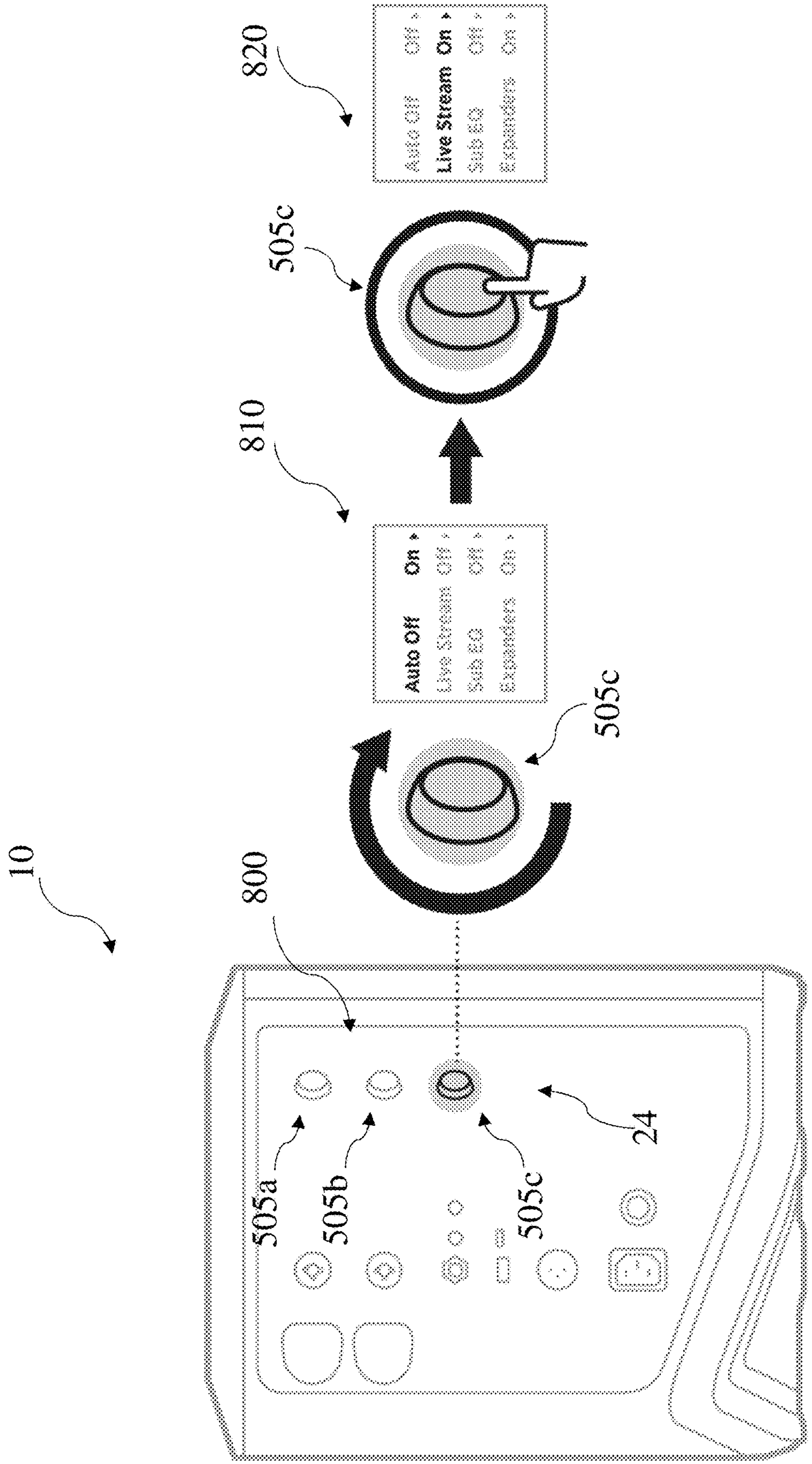
FIG. 16 is a schematic illustration of progressive control functions on a loudspeaker according to various implementations.
Figure 17:
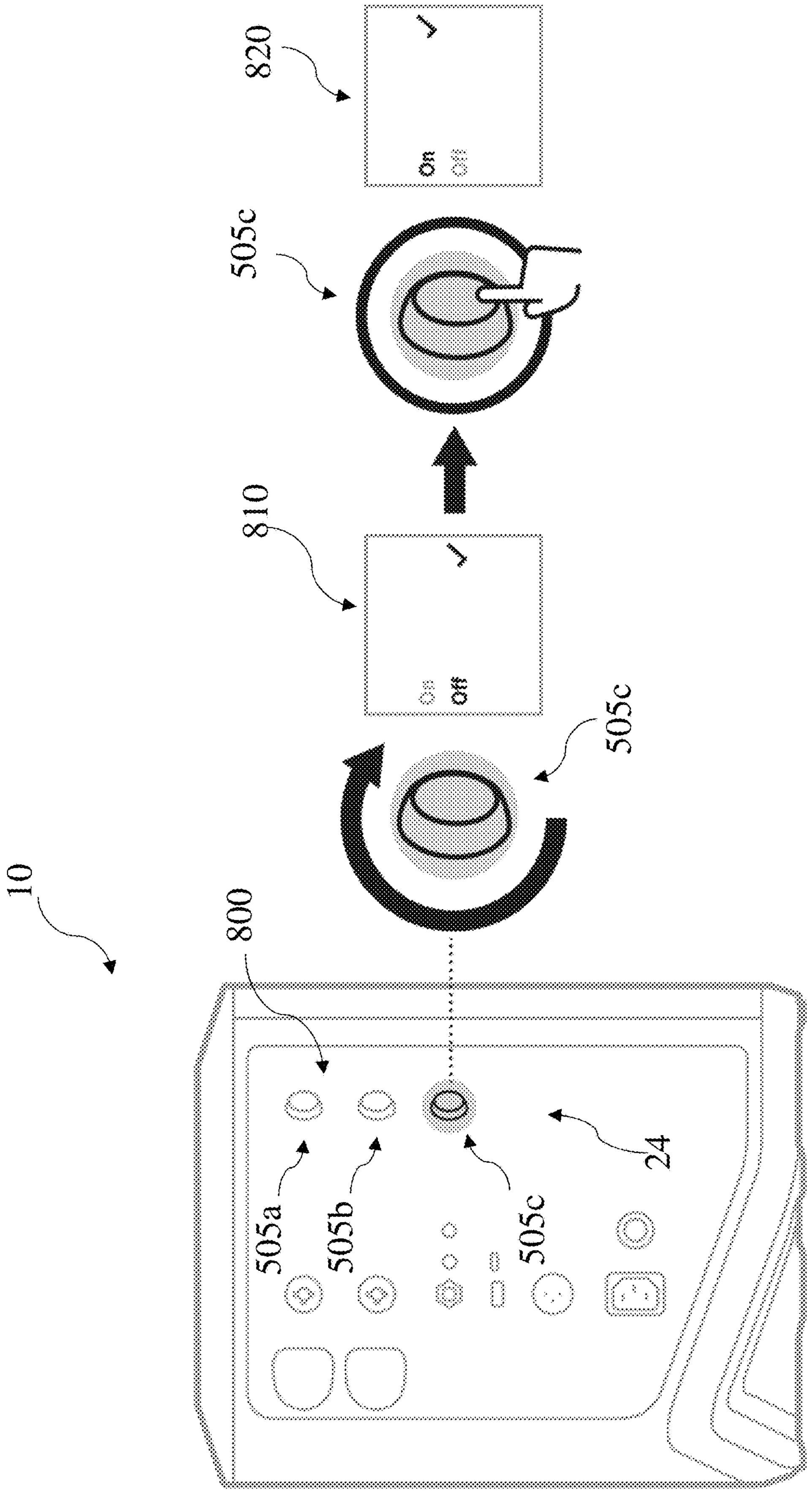
FIG. 17 is a schematic illustration of additional control functions on a loudspeaker according to various implementations.

In one example, the loudspeaker 10 is configured to operate in a first mode including outputting the first set of audio output signals. In some cases, this first mode is a default operating mode for the loudspeaker 10. In additional implementations, a second mode (e.g., Live Stream) includes outputting both the first set of audio output signals (e.g., as monitor output to transducers 82, 84) and the second set of audio output signals (e.g., to computing device 710 and/or additional network connected devices). In certain implementations, switching between the first mode and the second mode includes a multi-modal adjustment at the interface 800. In some examples, the multi-modal adjustment includes a press-and-hold command, a press-and-turn command, etc. FIG. 15 illustrates an example of a press-and-hold command instruction at interfaces 810, 820 to enable selection of a second or subsequent operating mode (e.g., Live Stream). FIGS. 16 and 17 illustrate a progression in the selection of a second or subsequent operating mode (e.g., Live Stream) via interfaces 810, 820, using rotation of the adjustment control 505*c*. In this example implementation, a single adjustment control (e.g., 505*c*) can be used to switch between operating modes at interface 800.

Figure 18:
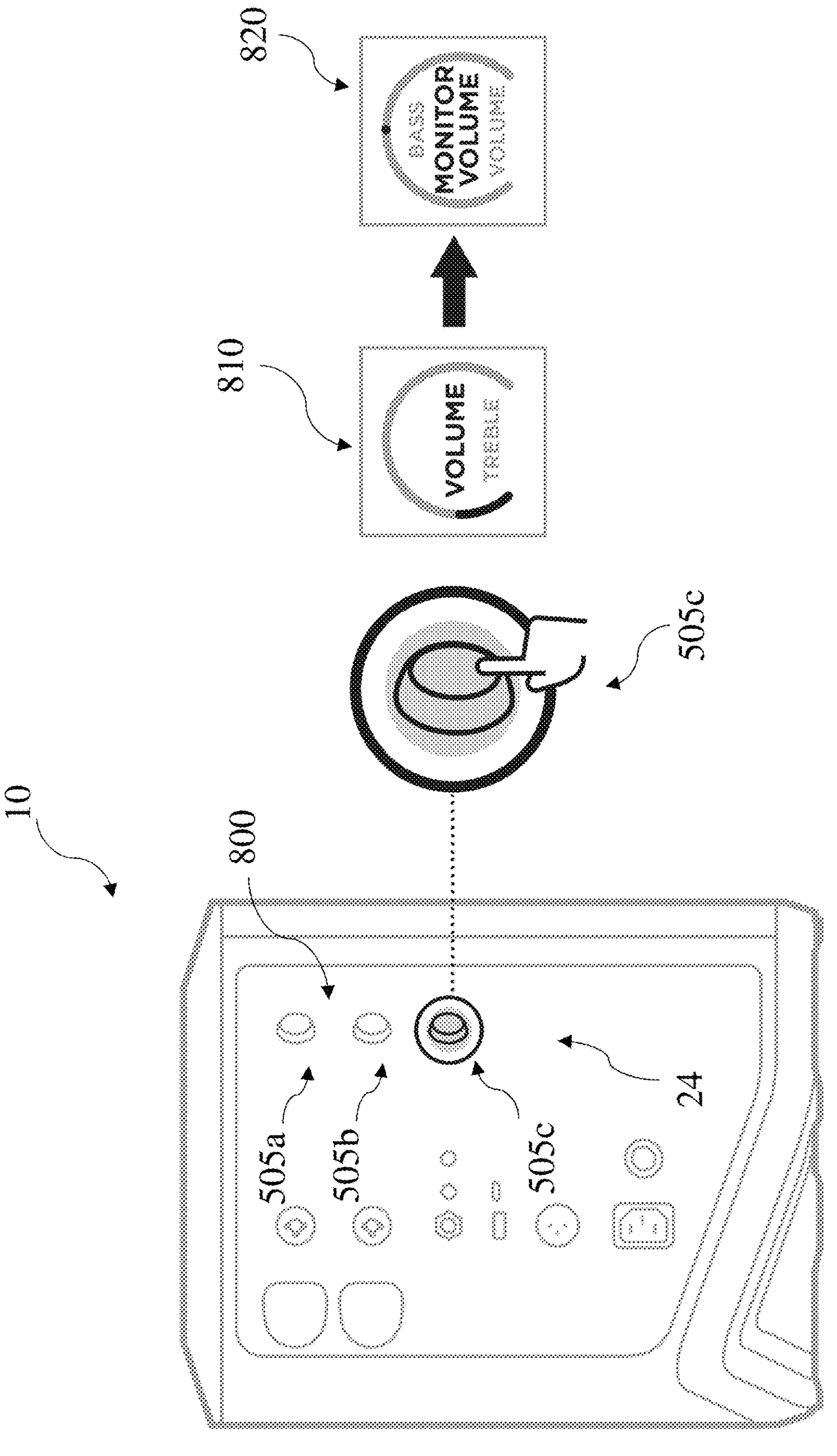
FIG. 18 is a schematic illustration of volume control functions on a loudspeaker according to various implementations.
Figure 19:
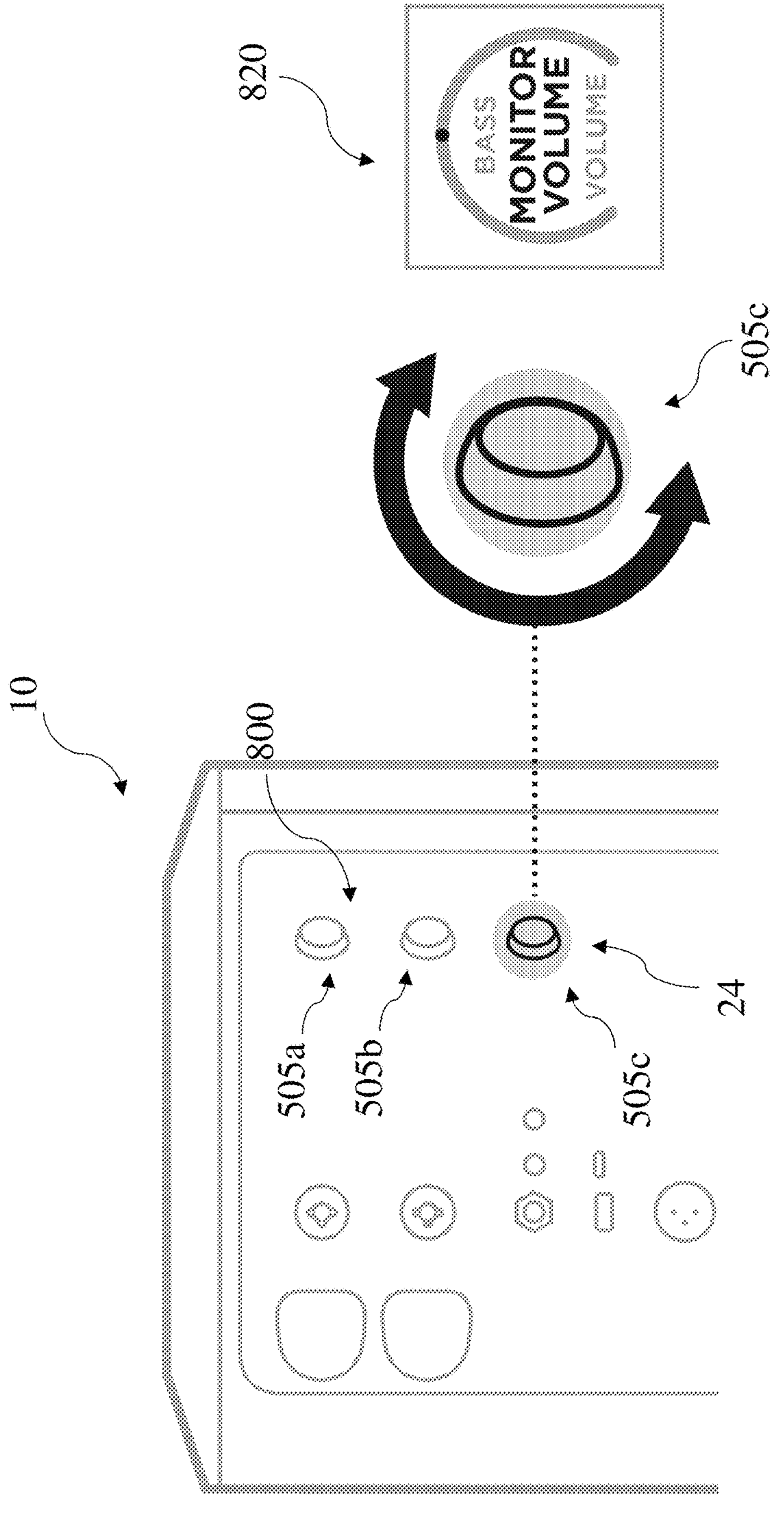
FIG. 19 is a schematic illustration of an additional volume control function on a loudspeaker according to various implementations.

In some cases, within a given mode, for example, where both the first and second set of audio output signals are provided (also called, Live Stream herein) the processor 100 enables operation in at least two (sub) modes, including, a first mode where a volume level of the first set of audio output signals (to Amp) and a volume level of the second set of audio output signals (to USB) are coupled, and a second mode where the volume level of the first set of audio output signals (to Amp) and the volume level of the second set of audio output signals (to USB) are de-coupled. That is, in certain implementations, the processor 100 enables independent adjustment of the first set of audio output signals (to Amp) and the second set of audio output signals (to USB). For example, the processor 100 can be configured to enable distinct volume control of the first set of audio output signals (to Amp) and the second set of audio output signals (to USB). In certain cases, distinct volume control includes applying distinct gains to the input signals from Channels 1, 2, and/or 3 (BT). For example, with continuing reference to FIG. 5, the processor 100 can be configured to command the audio input module 110 to apply a distinct gain to the input signals (e.g., from Insert Mode Audio In via channels 120 and/or from Wireless Inputs at channels 150) to enable distinct volume control of the output signals (to Amp v. to USB). An example interface progression of the distinct volume controls in a Live Stream mode is shown in FIGS. 18 and 19, in which the processor 100 responds to actuation of adjustment control 505*c* (e.g., press and hold, press and release, repetitive press-and-release, etc.) to show distinct interfaces 810, 820, enabling independent control of volume of the first and second audio output, respectively. For example, interface 820 shows a "monitor volume" control that enables independent control of the volume of first audio output (to Amp) relative to the volume of second audio output (to USB). FIG. 19 shows additional (e.g., subsequent) actuation of adjustment control 505*c* (e.g., rotation, slide, etc.) to adjust the volume of the first audio output (to Amp) while maintaining the volume level of the second audio output (to USB).

Further, the processor 100 can enable distinct equalization (EQ) settings and/or distinct mix settings of one or both of the first set of audio output signals (to Amp) and the second set of audio output signals (to USB). In certain cases, the distinct mix settings are applied to a mix of at least two inputs, e.g., inputs to Channel 1, Channel 2, and/or Channel 3 (BT). In some cases, adjusting the monitor volume (first audio output), EQ settings, and/or mix settings is only available on the interface 800 at the loudspeaker 10. In other cases, the monitor volume EQ settings, and/or mix settings are adjustable via an interface on a connected smart device such as computing device 710.

In additional implementations, the loudspeaker 10 also includes a mixer coupled with the audio input (e.g., Channel(s) 120, 150, Wireless Channel (BT), FIG. 5). In some cases, the mixer is a component in audio input module 110 or coupled with audio input module 110, e.g., an electronic component and/or a software stack. In particular cases, the audio input to loudspeaker 10 can include at least two inputs or up to three inputs, e.g., from each of the Channels 1, 2, and 3 (BT), and the mixer is configured to mix the input signals from the Channels 1, 2, 3. In some aspects, the mixer is configured to provide the second set of audio output signals (to USB) as a dual mono mix of the multiple input channels (Channel 1, Channel 2). In additional implementations including a mixer, one or more adjustment controls 505 can enable adjustment of the mix. For example, during default operation (e.g., single output mode such as To Amp), adjustment control 505*a* can control volume of Channel 1, adjustment control 505*b* can control volume of Channel 2, and adjustment control 505*c* can control volume of Channel 3 (BT). When the loudspeaker 10 is operating in a dual output mode (e.g., Live Stream mode, or first and second audio outputs To Amp and To USB, respectively), the adjustment controls 505*a*, 505*b*, 505*c* can enable fading of the mixer and/or a level of a corresponding channel within a dual mono mix. For example, while Live Stream mode is activated, adjustment controls 505*a*, 505*b*, 505*c* can enable fading adjustment and/or channel level adjustment of respective channels (e.g., Channel 1, Channel 2, Channel 3 (BT)) in a dual mono mix.

In particular implementations, after activating Live Stream mode, the loudspeaker 10 remains in that mode until a trigger is detected. A trigger can include a power cycle event, disconnecting of one or more input devices, or a command received at an interface (e.g., interface 800 and/or on a connected device such as computing device 710 or smart device 760).

As described herein, the loudspeaker 10 can provide a number of practical and beneficial configurations for users, including but not limited to: wireless instrument and/or microphone connectivity, automatic channel detection and audio adjustment, dynamic display characteristics, and audio monitoring and network connectivity. As compared with conventional portable loudspeakers, e.g., portable PA loudspeakers, the loudspeaker 10 can enhance the user experience and provide numerous benefits.

One or more components in the loudspeaker 10 can be formed of any conventional loudspeaker material, e.g., a heavy plastic, metal (e.g., aluminum, or alloys such as alloys of aluminum), composite material, etc. It is understood that the relative proportions, sizes and shapes of the loudspeaker 10 and components and features thereof as shown in the FIGURES included herein can be merely illustrative of such physical attributes of these components. That is, these proportions, shapes and sizes can be modified according to various implementations to fit a variety of products.

As used herein, controllers and/or control circuit(s), where applicable, can include a processor and/or microcontroller, which in turn can include electro-mechanical control hardware/software, and decoders, DSP hardware/software, etc. for playing back (rendering) audio content at the loudspeaker 10, as well as for communicating with other components in the loudspeaker 10. The control circuit(s) can also include one or more digital-to-analog (D/A) converters for converting the digital audio signal to an analog audio signal. This audio hardware can also include one or more amplifiers which provide amplified analog audio signals to the loudspeaker(s) 10. In additional implementations, the controller/control circuit(s) include sensor data processing logic for processing data from sensors.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

I claim:

1. A portable speaker, comprising:

at least one electro-acoustic transducer for providing an acoustic output;

an audio input for receiving one or more audio input signals;

an audio output for providing one or more audio output signals;

a communication module for providing a network communication link; and a processor configured to receive the audio input signals and to process the audio input signals to provide the audio output signals, wherein the processor is configured, from a common set of audio input signals, to provide, a first set of audio output signals to the electro-acoustic transducer, such that the first set of audio output signals act as a monitor of the one or more audio input signals, and a second set of audio output signals via the network communication link, wherein the processor enables:

independent adjustment of the first set of audio output signals and the second set of audio output signals, and operation in at least two modes, including, a first mode wherein a volume level of the first set of audio output signals and a volume level of the second set of audio output signals are coupled, and a second mode wherein the volume level of the first set of audio output signals and the volume level of the second set of audio output signals are decoupled.

2. The portable loudspeaker of claim 1, wherein the processor includes a digital audio workstation (DAW) for controlling the second set of output signals.

3. The portable loudspeaker of claim 1, wherein the second set of audio output signals are sent to at least one of a digital audio workstation, a live stream, or a network-connected recording device via the network communication link.

4. The portable loudspeaker of claim 1, further comprising an amplifier configured to provide an amplified audio signal from at least one of the audio input signals or the audio output signals, wherein the at least one electro-acoustic transducer is configured to provide an acoustic output based on the amplified audio signal.

5. The portable loudspeaker of claim 1, wherein the first set of audio output signals and the second set of audio output signals are provided approximately simultaneously.

6. The portable loudspeaker of claim 1, wherein the processor enables distinct volume control of the first set of audio output signals and the second set of audio output signals.

7. The portable loudspeaker of claim 1, wherein the processor enables at least one of distinct equalization settings or distinct mix settings of one or both of the first set of audio output signals and the second set of audio output signals.

8. The portable loudspeaker of claim 1, further comprising a user interface enabling switching between the first mode and the second mode, wherein switching between the first mode and the second mode includes a multi-modal adjustment at the user interface.

9. The portable loudspeaker of claim 1, further comprising a mixer coupled with the audio input, wherein the audio input includes at least two inputs.

10. The portable loudspeaker of claim 1, wherein the second set of audio output signals includes a dual mono mix of multiple input channels.

11. The portable loudspeaker of claim 10, further comprising a set of channel volume controls, wherein after activation of a live stream mode that provides the second set of audio output signals, the set of channel volume controls act as faders on a mixer.

12. The portable loudspeaker of claim 11, wherein adjusting a channel volume control adjusts a level of a corresponding channel within the dual mono mix.

13. The portable loudspeaker of claim 11, wherein the channel volume controls are located at least one of: a) on a housing of the portable loudspeaker, or b) on a control device connected with the portable loudspeaker.

14. The portable loudspeaker of claim 1, wherein processing the audio input signals includes adjusting at least one of a relative signal level, an equalization, or a reverb of any of one or more of the audio input signals.

15. The portable loudspeaker of claim 1, wherein the processor enables a user to synchronously provide audio output locally with the monitor while streaming or recording the audio output via the network communication link.

16. A method of controlling a portable loudspeaker with a network communication link, the method comprising:

receiving one or more audio input signals from an audio input; and processing the audio input signals to provide audio output signals, wherein the processing includes providing:

a first set of audio output signals to an electro-acoustic transducer at the portable loudspeaker, such that the first set of audio output signals act as a monitor of the one or more audio input signals, and a second set of audio output signals via the network communication link, wherein the processing further includes:

enabling independent adjustment of the first set of audio output signals and the second set of audio output signals, and operating the portable loudspeaker in at least two modes, including, a first mode wherein a volume level of the first set of audio output signals and a volume level of the second set of audio output signals are coupled, and a second mode wherein the volume level of the first set of audio output signals and the volume level of the second set of audio output signals are decoupled.

17. The method of claim 16, wherein the first set of audio output signals and the second set of audio output signals are provided approximately simultaneously.

18. A portable speaker, comprising:

at least one electro-acoustic transducer for providing an acoustic output;

an audio input for receiving one or more audio input signals;

an audio output for providing one or more audio output signals;

a communication module for providing a network communication link;

a set of channel volume controls; and a processor configured to receive the audio input signals and to process the audio input signals to provide the audio output signals, wherein the processor is configured, from a common set of audio input signals, to provide, a first set of audio output signals to the electro-acoustic transducer, such that the first set of audio output signals act as a monitor of the one or more audio input signals, and a second set of audio output signals via the network communication link, wherein the second set of audio output signals includes a dual mono mix of multiple input channels, wherein after activation of a live stream mode that provides the second set of audio output signals, the set of channel volume controls act as faders on a mixer.

19. The portable loudspeaker of claim 18, wherein the processor includes a digital audio workstation (DAW) for controlling the second set of output signals.

* * * * *